US012799954B2

(12) United States Patent
Deel

(10) Patent No.: US 12,799,954 B2
(45) Date of Patent: Nov. 17, 2026

(54) MODULAR RECIPROCATING PUMP ROD COLUMN SYSTEM, ROD COLUMN ASSEMBLY, PLUNGER ROD COLUMN ASSEMBLY, AND METHODS OF USE

(71) Applicant: Steven K. Deel, Overland Park, KS (US)

(72) Inventor: Steven K. Deel, Overland Park, KS (US)

( * ) Notice: Subject to any disclaimer, the term of this patent is extended or adjusted under 35 U.S.C. 154(b) by 0 days.

(21) Appl. No.: 19/332,145

(22) Filed: Sep. 18, 2025

(65) Prior Publication Data

US 2026/0078780 A1 Mar. 19, 2026

Related U.S. Application Data

(60) Provisional application No. 63/695,901, filed on Sep. 18, 2024.

(51) Int. Cl.
*F15B 15/16* (2006.01)
*F15B 15/14* (2006.01)

(52) U.S. Cl.
CPC .......... *F15B 15/1447* (2013.01); *F15B 15/16* (2013.01)

(58) Field of Classification Search
CPC .... F15B 15/1447; F15B 15/16; F04B 53/147; F04B 53/144
See application file for complete search history.

(56) References Cited

U.S. PATENT DOCUMENTS 5,507,219 A * 4/1996 Stogner ................. F04B 53/147 74/44

FOREIGN PATENT DOCUMENTS

GB 2309501 A * 7/1997 ............ F04B 53/147
WO WO-9914499 A1 * 3/1999 ............ F04B 53/147
WO WO-2023121993 A1 * 6/2023 .............. F04B 53/22

* cited by examiner

*Primary Examiner* — Nathaniel E Wiehe
*Assistant Examiner* — Daniel S Collins
(74) *Attorney, Agent, or Firm* — Niq Howard

(57) ABSTRACT

A modular reciprocating pump rod column assembly and system are presented. The present disclosure provides the state of the art with a hydraulically actuated extension rod assembly with a piston and a hydraulically actuated extension rod assembly with a plunger. The rod column assembly that can be converted to plunger and vis-versa. The hydraulic system provides for spring compression based on a hydraulic piston installed inside the primary extension rod. As hydraulic pressure is applied through a port located in the end cap, it is fed through a cross port drilled in the extension rod assembly to the blind end of the internal piston. When pressurized the piston moves forward, compressing the springs against the end cap when in turn extends the center shaft, relieving tension on the forward and rear rod column pins. Releasing the hydraulic pressure allows the springs to extend, retracting the center shaft.

20 Claims, 75 Drawing Sheets

MODULAR RECIPROCATING PUMP ROD COLUMN SYSTEM, ROD COLUMN ASSEMBLY, PLUNGER ROD COLUMN ASSEMBLY, AND METHODS OF USE

CROSS-REFERENCE TO RELATED APPLICATIONS

The present application claims priority to the U.S. Provisional Patent Application No. 63/695,901 which was filed on Sep. 18, 2024, which is hereby incorporated by reference herein in its entirety, including any figures, tables, or drawings.

FIELD OF THE DISCLOSURE

This disclosure relates to a modular reciprocating pump rod column system, a rod column assembly, a plunger rod column assembly, and methods of use. More specifically, and without limitation, the present disclosure relates to a rod column assembly that can be converted to a plunger assembly while being both cost-effective and efficient to operate.

BACKGROUND OF THE DISCLOSURE

Reciprocating mud pumps are well known in the art. Pressurized pumping systems are well known in the art. Pressurized pumps are the predominant fuel-pumping method used in the art today. As one example, and used herein for ease of explanation and application, reciprocating pumps are utilized in the drilling process to deliver high pressure fluid for fuel extraction.

These pumps, also referred to as mud pumps, may be single or multi-cylinder pumps and/or may also refer to as multiplex pumps, such as those found in fracking applications. Said another way, the drilling or oil and gas wells used in drilling involve and require the use of large reciprocating pumps generally referred to as mud pumps. These pumps provide high pressure drilling fluid also known as drilling mud, to the well bore.

These high pressure pumps, or mud pumps, are typically composed of two sections and/or two ends, a power end and a fluid end. During operation, mud pumps convert drilling fluid from low pressure to high pressure by compressing it within the fluid end assembly. This is achieved by the conversion of energy from a rotating (crankshaft) assembly to linear motion at a crosshead. High pressure in a fluid end of a mud pump is generated by the reciprocating motion of a piston operating inside a cylindrical housing referred to as a liner.

Rod column, connect the piston to the crosshead. In modern mud pump operation, the rod column typically consists of an extension rod, a piston rod, and clamps-which fasten the extension and piston rod together. The piston is attached to the end of the piston rod with a heavy hex nut. The extension rod is typically fixed to the nose of the crosshead with fasteners such as cap screws.

In modern operation, the traditional style rod assemblies will develop wear in the clamp areas-which results in inadequate fastening of the individual components- and in turn excessive movement between the piston and crosshead. This excessive movement can lead to premature failure of the piston and liner as the two components are not being held concentric relative to each other. Due to the size and cost of these components, replacement, when necessary, can be time consuming and expensive.

Traditional systems are prone to wear and failure. Due to high pressure and regular use, it is only a matter of time before machines break down.

Complicating matters further, in existing systems, the bolts will feel tight even when the rod components are in fact loose. These circumstances can be dangerous for users and operations of the equipment. In some other cases, modern advanced systems utilize high pressure hydraulic pumps with special hydraulic connectors. This solution results in much higher costs and requires specialized tooling. These systems, existing in the art today, also wear and require component replacement rapidly, as with the traditional rod column design.

Thus, no good solution has been found in the state of the art which provides an alternative to high costs and high maintenance costs and time demands.

As such, the present disclosure provides the state of the art with an improved design which provides for a plunger replacement which is cost effective and provides for an easier replacement for a repair. In this way, the present invention provides an assembly which improves upon the state of the art.

SUMMARY OF THE DISCLOSURE

A modular reciprocating pump rod column system, a rod column assembly, a plunger rod column assembly, and methods of use are presented.

Thus, it is a primary object of the disclosure to provide a modular reciprocating pump rod column system, a rod column assembly, a plunger rod column assembly, and methods of use that improves upon the state of the art.

Another object of the disclosure is to provide a modular reciprocating pump rod column system, a rod column assembly, a plunger rod column assembly, and methods of use that can be configured to be operated manually or hydraulically based on the user's preference and/or application by changing the extension rod end cap assembly.

Yet another object of the disclosure is to provide a modular reciprocating pump rod column system, a rod column assembly, a plunger rod column assembly, and methods of use that is cost effective to manufacture, efficient to operate, and provides for a reduced cost of ownership for the end user.

Another object of the disclosure is to provide a modular reciprocating pump rod column system, a rod column assembly, a plunger rod column assembly, and methods of use that provides for operation of the pump with either pistons or plungers with minimal time and effort between the two systems.

Yet another object of the disclosure is to provide a modular reciprocating pump rod column system, a rod column assembly, a plunger rod column assembly, and methods of use that provides an extension rod which provides for replacement of the end cap, reducing maintenance costs.

Yet another object of the disclosure is to provide a modular reciprocating pump rod column system, a rod column assembly, a plunger rod column assembly, and methods of use that provides a minimal number of components for reduced manufacturing costs.

Another object of the disclosure is to provide a modular reciprocating pump rod column system, a rod column assembly, a plunger rod column assembly, and methods of use that provides for easy replacement of components which are prone to wear.

Yet another object of the disclosure is to provide a modular reciprocating pump rod column system, a rod column assembly, a plunger rod column assembly, and methods of use that reduces costs of replacing components in system assemblies which are prone to wear.

Another object of the disclosure is to provide a modular reciprocating pump rod column system, a rod column assembly, a plunger rod column assembly, and methods of use that can utilize a shortened subrod.

Yet another object of the disclosure is to provide a modular reciprocating pump rod column system, a rod column assembly, a plunger rod column assembly, and methods of use that can handle retrofit of a plunger.

Another object of the disclosure is to provide a modular reciprocating pump rod column system, a rod column assembly, a plunger rod column assembly, and methods of use that Yet another object of the disclosure is to provide a modular reciprocating pump rod column system, a rod column assembly, a plunger rod column assembly, and methods of use that can accommodate a plunger assembly.

Another object of the disclosure is to provide a modular reciprocating pump rod column system, a rod column assembly, a plunger rod column assembly, and methods of use that can be adapted for use with plungers due to the length of the subrod design provided.

Yet another object of the disclosure is to provide a modular reciprocating pump rod column system, a rod column assembly, a plunger rod column assembly, and methods of use that provides a novel force carrying system for a column rod assembly.

Another object of the disclosure is to provide a modular reciprocating pump rod column system, a rod column assembly, a plunger rod column assembly, and methods of use that create the axial force for the system in an extension rod design.

The present disclosure further provides a rod column system, a rod column for a reciprocating mud pump, a rod column assembly, method of assembly and disassembly, and method of use are presented. The design presented provides the necessary clamping force for the rod components but can be operated with basic hand tools, such as a torque wrench. Said another way, this disclosure relates to a rod column system, a rod column for a reciprocating mud pump, a rod column assembly, method of assembly and disassembly, and method of use. More specifically, and without limitation, the present disclosure relates to a cost effective and efficient to operate rod column assembly. More specifically, and without limitation, the present disclosure relates to a simplified assembly which reduces cost and requires no specialized tooling to operate; providing additional cost savings.

Thus, there is a long-felt need in the art for a rod column system, a rod column for a reciprocating mud pump, a rod column assembly, method of assembly and disassembly, and method of use which improves upon the state of the art.

Thus, it is a primary object of the disclosure to provide a rod column system, a rod column for a reciprocating mud pump, a rod column assembly, method of assembly and disassembly, and method of use that improves upon the state of the art.

Another object of the disclosure is to provide a rod column system, a rod column for a reciprocating mud pump, a rod column assembly, method of assembly and disassembly, and method of use that is cost-effective.

Yet another object of the disclosure is to provide a rod column system, a rod column for a reciprocating mud pump, a rod column assembly, method of assembly and disassembly, and method of use that is efficient to operate.

Another object of the disclosure is to provide a rod column system, a rod column for a reciprocating mud pump, a rod column assembly, method of assembly and disassembly, and method of use that requires minimal components.

Yet another object of the disclosure is to provide a rod column system, a rod column for a reciprocating mud pump, a rod column assembly, method of assembly and disassembly, and method of use that reduces costs of operation.

Another object of the disclosure is to provide a rod column system, a rod column for a reciprocating mud pump, a rod column assembly, method of assembly and disassembly, and method of use that requires no special tooling.

Yet another object of the disclosure is to provide a rod column system, a rod column for a reciprocating mud pump, a rod column assembly, method of assembly and disassembly, and method of use that provides cost savings.

Another object of the disclosure is to provide a rod column system, a rod column for a reciprocating mud pump, a rod column assembly, method of assembly and disassembly, and method of use that is easier to maintain.

Yet another object of the disclosure is to provide a rod column system, a rod column for a reciprocating mud pump, a rod column assembly, method of assembly and disassembly, and method of use that requires less time for replacing a replaceable end; the location in which wear usually occurs in operations.

Another object of the disclosure is to provide a rod column system, a rod column for a reciprocating mud pump, a rod column assembly, method of assembly and disassembly, and method of use that provides a replaceable end.

Yet another object of the disclosure is to provide a rod column system, a rod column for a reciprocating mud pump, a rod column assembly, method of assembly and disassembly, and method of use that provides a rod column assembly which integrates with both a single or multiple piece extension rod.

Another object of the disclosure is to provide a rod column system, a rod column for a reciprocating mud pump, a rod column assembly, method of assembly and disassembly, and method of use that provides a novel subrod assembly.

Yet another object of the disclosure is to provide a rod column system, a rod column for a reciprocating mud pump, a rod column assembly, method of assembly and disassembly, and method of use that provides a subrod with a housing in which a male and female connector are located axially; the connectors being designed with recessed pockets having a tapered end on one side.

Another object of the disclosure is to provide a rod column system, a rod column for a reciprocating mud pump, a rod column assembly, method of assembly and disassembly, and method of use that is cost effective to manufacture.

Yet another object of the disclosure is to provide a rod column system, a rod column for a reciprocating mud pump, a rod column assembly, method of assembly and disassembly, and method of use which utilize a wedge method having a (1) bolt in the extension rod to loosen and (2) pins to connect the rod components; another design utilizing a hydraulic piston to loosen and (2) pins to connect the rod column components (as are further described herein).

Another object of the disclosure is to provide a rod column system, a rod column for a reciprocating mud pump, a rod column assembly, method of assembly and disassembly, and method of use that provides for limited replacement and/or end cap replacements if end cap is worn, further reducing maintenance costs in both parts and time.

Another object of the disclosure is to provide a rod column system, a rod column for a reciprocating mud pump, a rod column assembly, method of assembly and disassembly, and method of use that is easy to use.

Yet another object of the disclosure is to provide a rod column system, a rod column for a reciprocating mud pump, a rod column assembly, method of assembly and disassembly, and method of use that is safe to use.

Yet another object of the disclosure is to provide a rod column system, a rod column for a reciprocating mud pump, a rod column assembly, method of assembly and disassembly, and method of use that is quick and efficient.

Yet another object of the disclosure is to provide a rod column system, a rod column for a reciprocating mud pump, a rod column assembly, method of assembly and disassembly, and method of use that is robust.

Another object of the disclosure is to provide a rod column system, a rod column for a reciprocating mud pump, a rod column assembly, method of assembly and disassembly, and method of use that saves time for a user.

Yet another object of the disclosure is to provide a rod column system, a rod column for a reciprocating mud pump, a rod column assembly, method of assembly and disassembly, and method of use that saves energy.

Another object of the disclosure is to provide a rod column system, a rod column for a reciprocating mud pump, a rod column assembly, method of assembly and disassembly, and method of use that are high quality.

These and other objects, features, or advantages of the present disclosure will become apparent from the specification and claims.

BRIEF DESCRIPTION OF THE DRAWINGS

The drawings accompanying and forming part of this specification are included to depict certain aspects of the disclosure.

FIG. 76 is a top, perspective exploded view.

FIG. 77 is a top, perspective exploded view.

FIG. 78 is a top, perspective exploded view.

DETAILED DESCRIPTION OF THE DISCLOSURE

Figure 1:
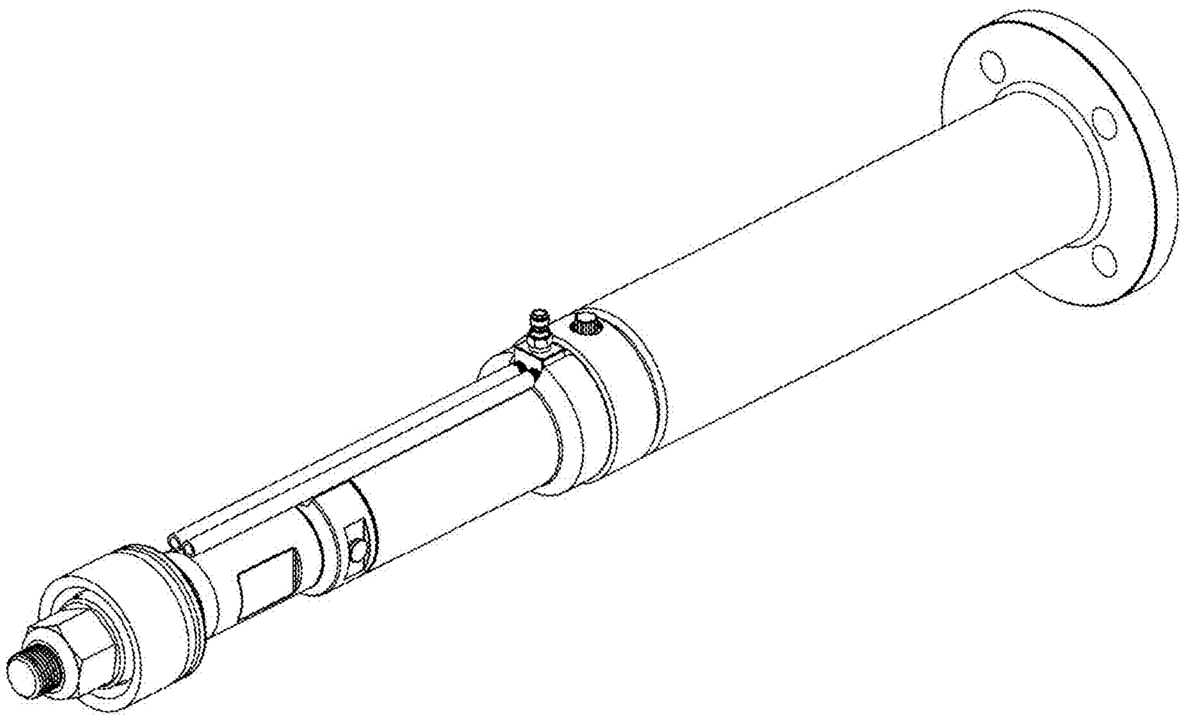
FIG. 1 is a top, perspective view of the modular reciprocating pump rod column system and/or rod column assembly; the view showing a wedge bolt operation; the view showing an extension rod; the view showing a subrod assembly, the view showing a piston rod assembly.
Figure 2:
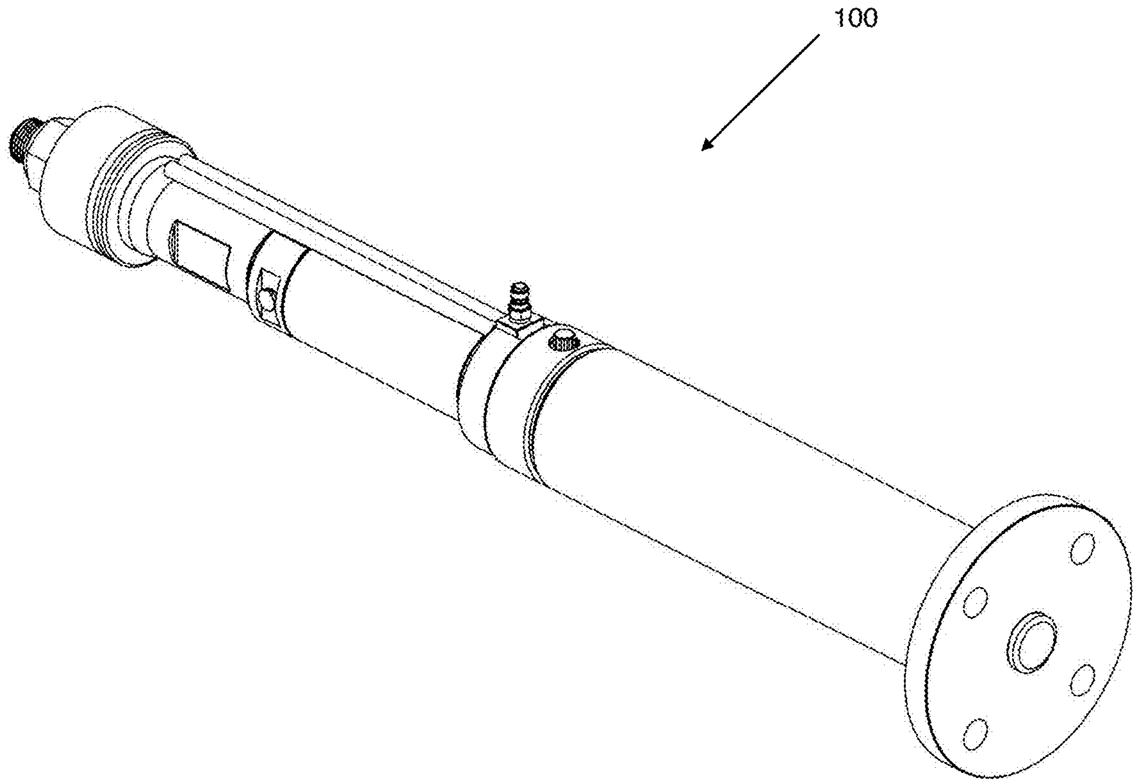
FIG. 2 is a top, perspective view of the modular reciprocating pump rod column system and/or rod column assembly; the view showing an extension rod; the view showing a subrod assembly, the view showing a piston rod assembly.
Figure 3:
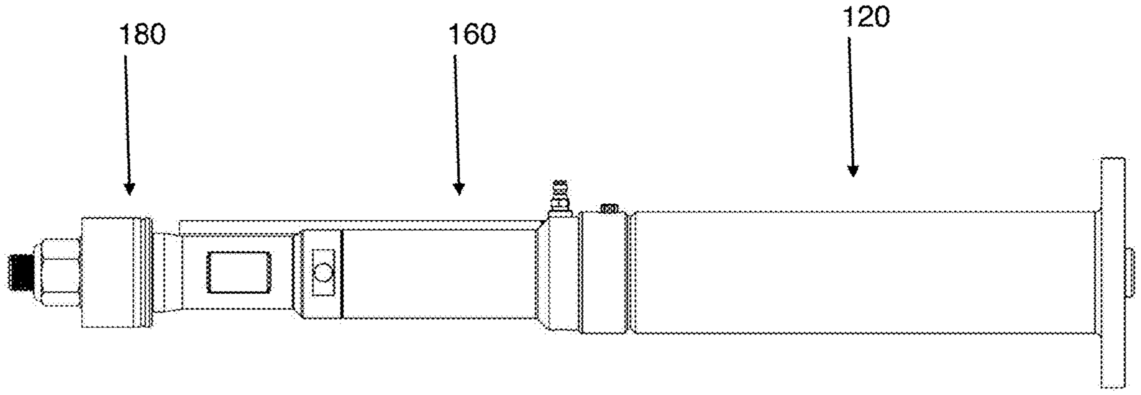
FIG. 3 is a side view of the modular reciprocating pump rod column system and/or rod column assembly; the view showing an extension rod; the view showing a subrod assembly, the view showing a piston rod assembly.
Figure 4:
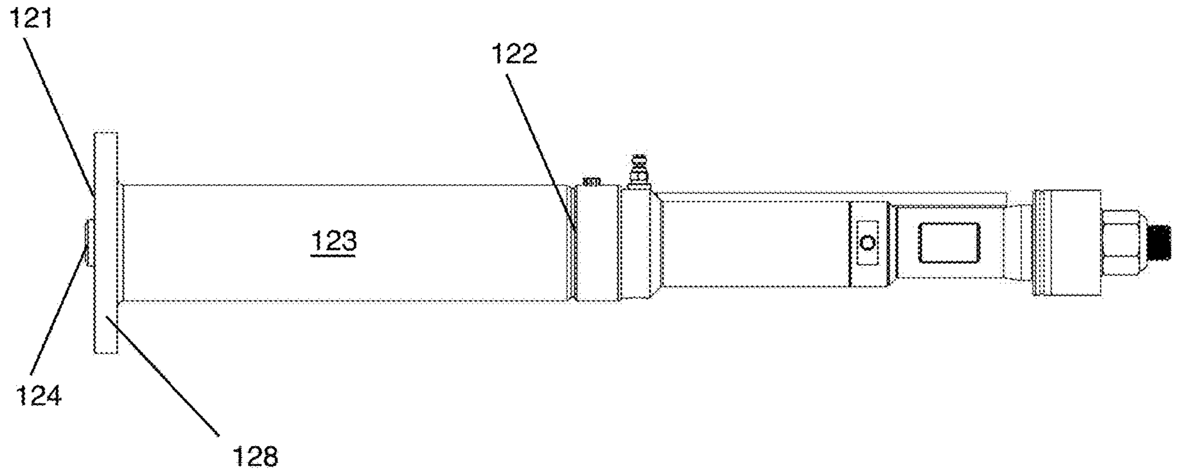
FIG. 4 is a side view of the modular reciprocating pump rod column system and/or rod column assembly; the view showing an extension rod; the view showing a subrod assembly, the view showing a piston rod assembly.
Figure 5:
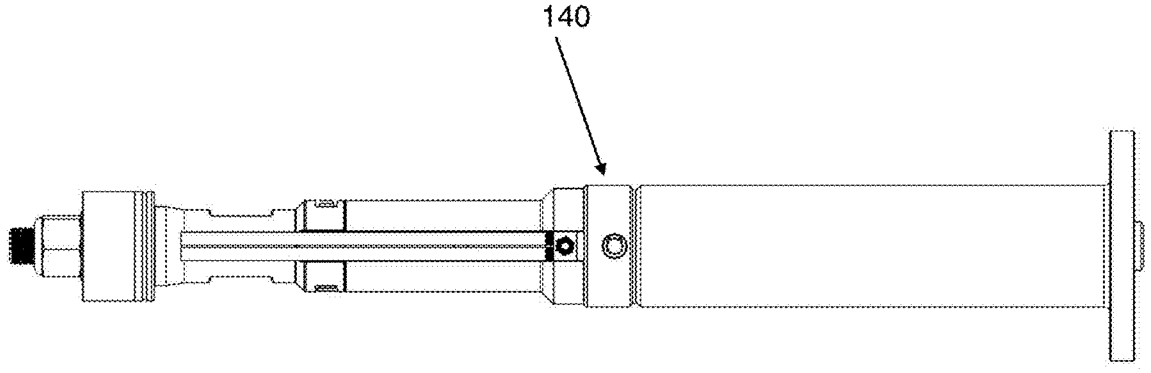
FIG. 5 is a top view of the modular reciprocating pump rod column system and/or rod column assembly; the view showing an extension rod; the view showing a subrod assembly, the view showing a piston rod assembly.
Figure 6:
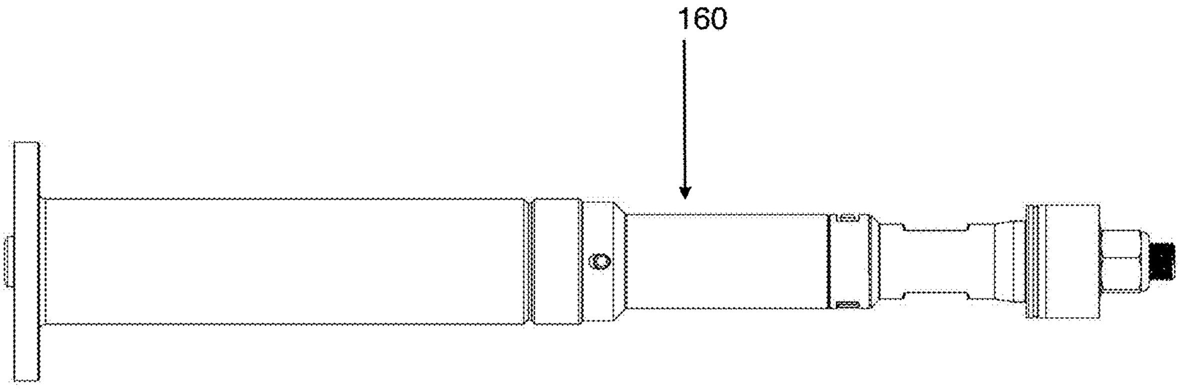
FIG. 6 is a bottom view of the modular reciprocating pump rod column system and/or rod column assembly; the view showing an extension rod; the view showing a subrod assembly, the view showing a piston rod assembly.
Figure 7:
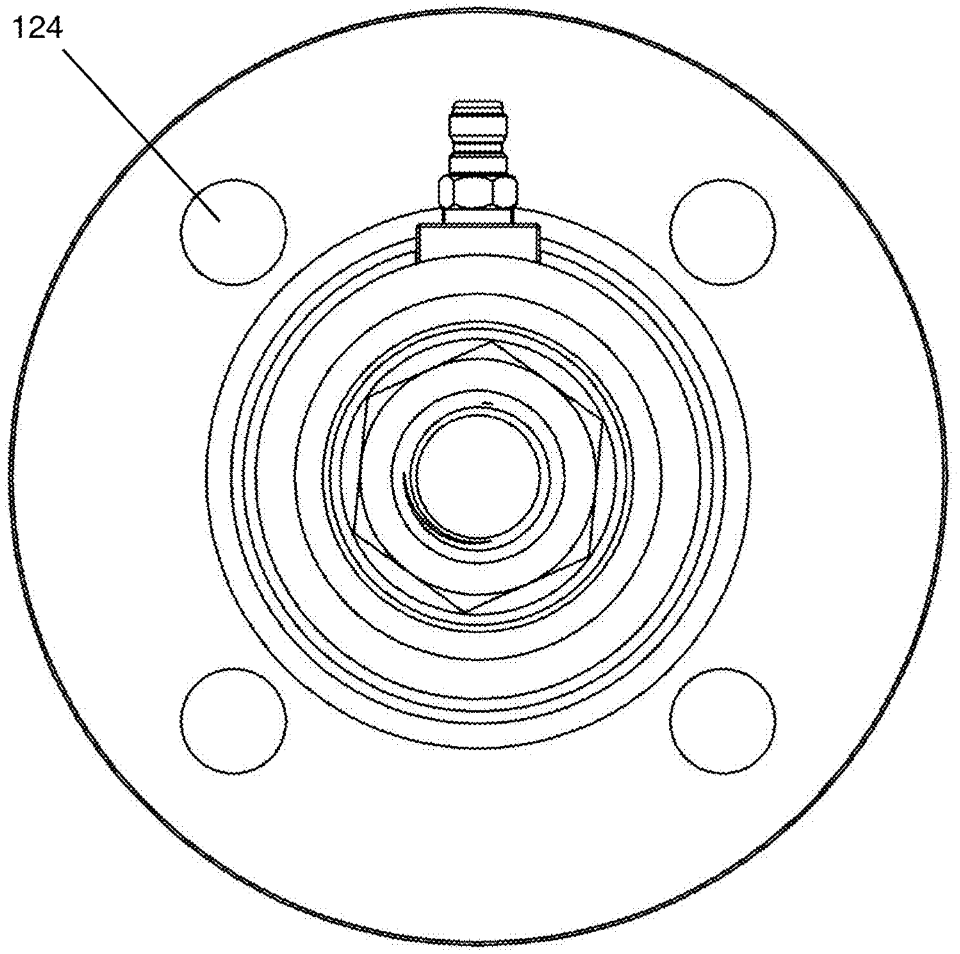
FIG. 7 is a front view of the modular reciprocating pump rod column system and/or rod column assembly; the view showing an extension rod; the view showing a subrod assembly, the view showing a piston rod assembly.
Figure 8:
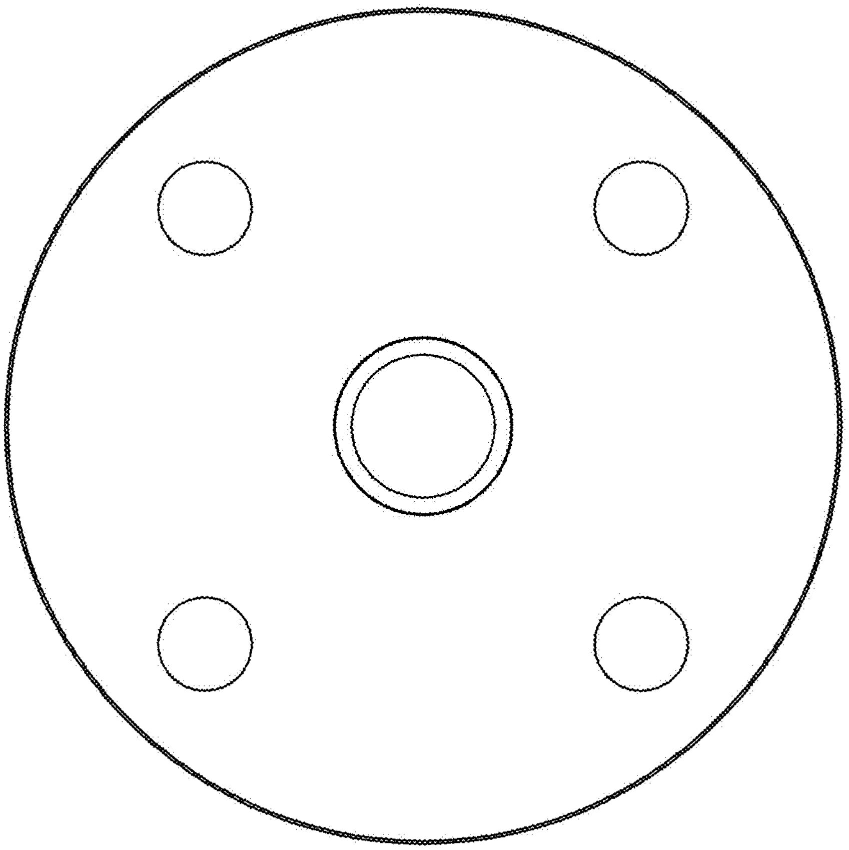
FIG. 8 is a rear view of the modular reciprocating pump rod column system and/or rod column assembly; the view showing an extension rod; the view showing a subrod assembly, the view showing a piston rod assembly.
Figure 9:
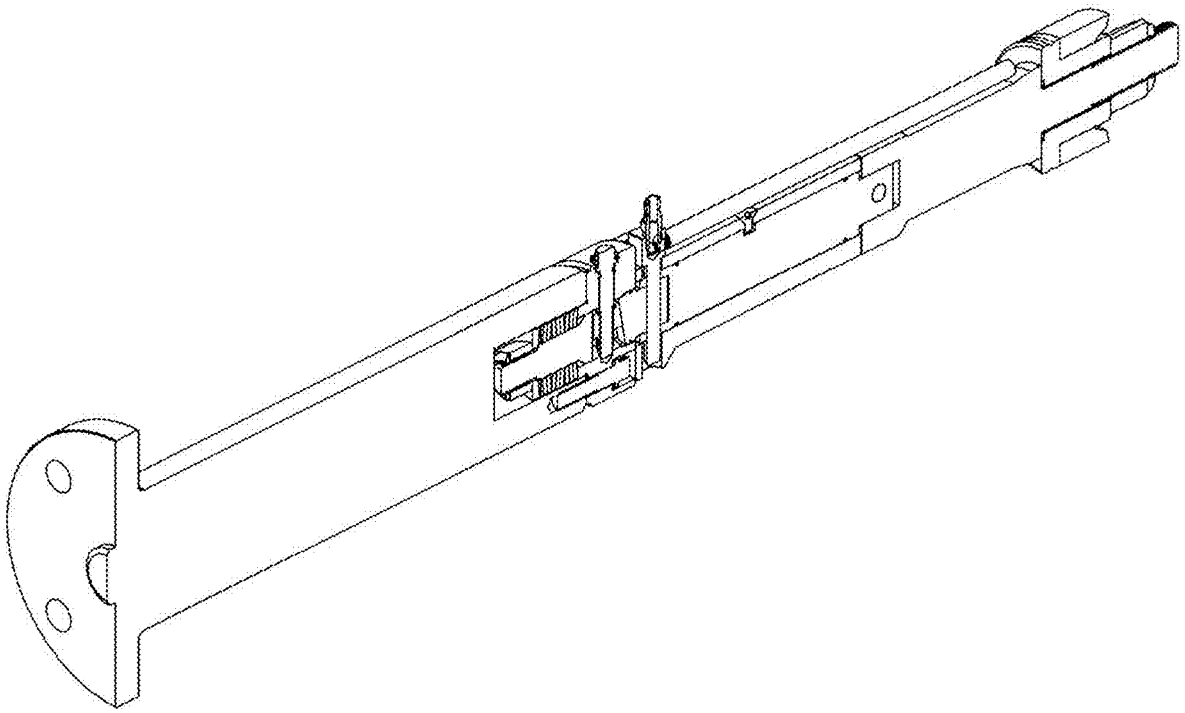
FIG. 9 is a top, perspective isometric cross-sectional view of the modular reciprocating pump rod column system and/or rod column assembly; the view showing an extension rod; the view showing a subrod assembly, the view showing a piston rod assembly.
Figure 10:
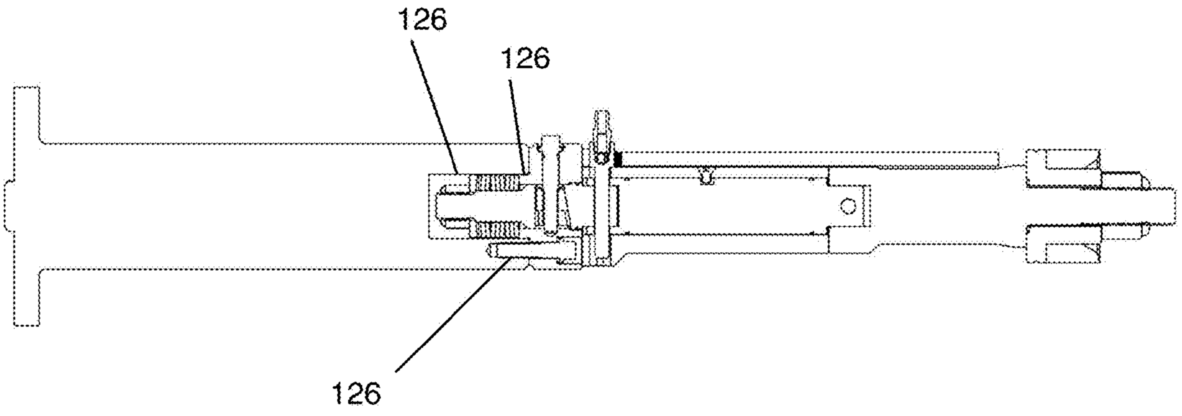
FIG. 10 is a cross-section view of the modular reciprocating pump rod column system and/or rod column assembly; the view showing an extension rod; the view showing a subrod assembly, the view showing a piston rod assembly.
Figure 11:
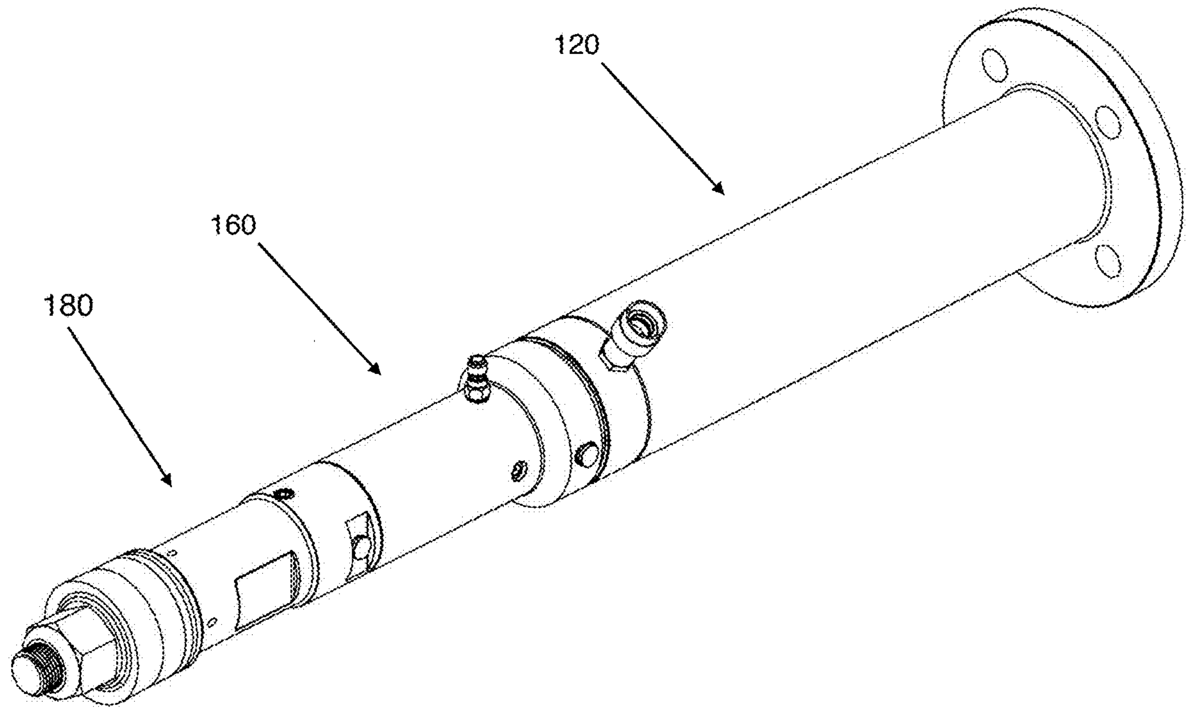
FIG. 11 is a top, perspective view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 12:
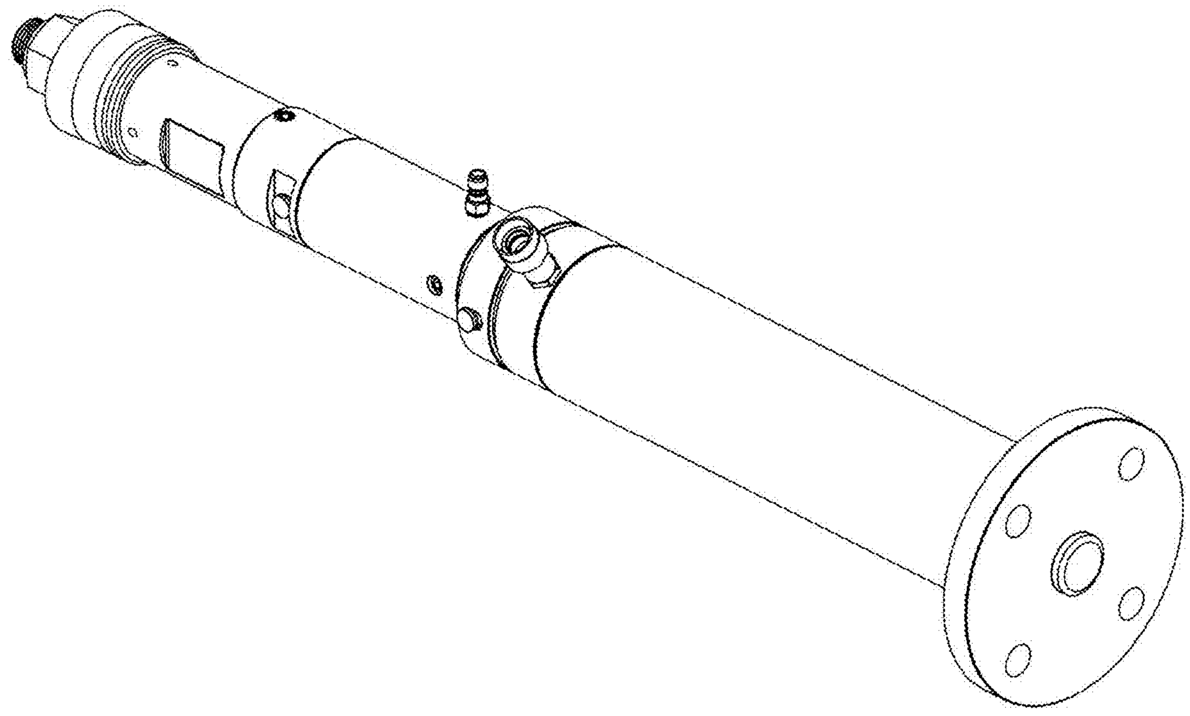
FIG. 12 is a top, perspective view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

System:

With reference to the figures, a modular reciprocating pump rod column system, a rod column assembly, a plunger rod column assembly, and methods of use are presented. a modular reciprocating pump rod column system, a rod column assembly, a plunger rod column assembly, and methods of use 100 are formed of any suitable size, shape and design.

In the arrangement shown, as one example, system (or "rod column assembly") 100 includes, in the embodiment(s) depicted, a mud pump 20, the mud pump 20 having a power end 22, the mud pump 20 having a crankshaft assembly 24, the mud pump 20 having a crosshead 28, a piston 30, the mud pup 20 having a fluid end 40, and a rod column assembly 100. The rod column assembly 100 having an extension rod 120, the rod column assembly 100 having an end cap assembly 140, and the rod column assembly 100 having a piston rod assembly 180, among other components, features, and functions.

In the arrangement shown, as one example, rod column assembly 100 is configured to be cost-effective and efficient to operate, greatly improving on the state of the art. The rod column assembly 100 is configured as a simplified and sophisticated design with minimal components, minimal components being impossible to achieve in the state of the art. In this way, the rod column assembly 100 provided reduces cost for assembly, reduces cost for maintenance, requires no specialized tooling for operation, and requires no specialized tooling for maintenance. Furthermore, and in the arrangement shown, rod column assembly 100 provides an ease of replacing commonly worn components through a unique design which changes the state of the art of piston rods in mud pumps.

In the arrangement shown, system 100 includes a rod column which can be mechanically operated with hand tools; requiring no high pressure pump to operate. Furthermore system 100 requires no hydraulic pistons or seals. This is advantageous over the current state of the art because these are components which often fail, requiring replacement and/or repair and/or maintenance.

Furthermore, in the arrangement shown, system 100 provides a consistent clamp force of the rod columns components as the clamp force is produced by the spring pack. In this way, the clamp force is not dependent on a bolt torque, further easing assembly, disassembly and operation.

In the arrangement shown, system 100 provides a wedge bolt which is loose during pump operation. The wedge bolt causing the wedge to be loose during operation does not result in a loosening of the system or a loss in clamp load while the system is running, despite vibrations and the like. (further explanation provided herein).

Furthermore, in the arrangement shown, system 100 is configured with all rod components pulling from a single point. This prevents wear and increases the duration of the assembly. Furthermore, the simplified subrod design disclosed herein provides for an external housing which serves as a spacer between the extension rod and the piston rod. This further reduces wear and provides additional benefits. Additionally, in the arrangement shown, as one example, the internal shaft carries the axial force of the extension rod shaft through to the piston rod. Said another way, the axial force pulling the rod column components together acts in one direction. The state of the art currently requires axial force created in 2 directions (opposite directions), which pull existing subrod assemblies to each end of the subrod. The present disclosure utilizes a singular force in a single direction, specifically an axial force acting in a single direction. The present art teaches away from utilizing a single directional axial force. The single directional axial force provides a myriad of benefits for maintenance, replacement, and the like.

In the arrangement shown, as one example, system 100 is configured to provide an extension rod end cap (to be further described herein). The end cap can be replaced with relative ease should the end cap wear or require replacement. This prevents having to replace an entire rod assembly. This is not available in the state of the art due to the nature of existing assemblies and the operational environments. Furthermore, the replaceable end cap assembly disclosed herein can be manufactured from a different material than the primary extension rod. In this way, flexibility in selecting a more durable material and/or heat durable material for preventing wear is possible in the present disclosure.

In the arrangement shown, system 100 is configured to provide adaptation of a plunger and/or packing without replacing an entire rod column. Existing systems teach and utilize the subrod assembly to house the components used to create the axial forces for a typical rod column system. This makes shrinking or shortening the subrod impossible. The present disclosure provides the state of the art which makes it possible to shrink the subrod and thus retrofit and/or install a plunger. To achieve this, the present system utilizes the extension rod to house the axial force components which are required to carry rod column load.

More specifically, in recent times, a desire to increase operating pressures has become desirable but equipment can not be retrofitted for such pressures without replacement equipment or entirely new rod columns. The present system provides for retrofitting plunger systems which can handle the higher pressures while still handling the load with minimal maintenance requirements and ease of operation and ease of installation.

In the arrangement shown, system 100 is a new design for a mud pump column assembly. The system includes an actuator which is located in the extension rod. The system can be operated with a socket or wrench, and without high-pressure hydraulics to assemble or disassemble the system.

In the arrangement shown, as one example, the power section is included in the extension rod. Existing art utilizes the subrod assembly as the component providing axial force to clamp the rod sections together.

User (or Plurality Thereof):

In the arrangement shown, as one example, system 100 may include a user. User 11 may be any user interacting with or utilizing the system 10. This may include viewing, controlling, analyzing, manipulating, and/or interacting with system 10. User 11 is not limited to a single user but may be a plurality of users.

Figure 13:
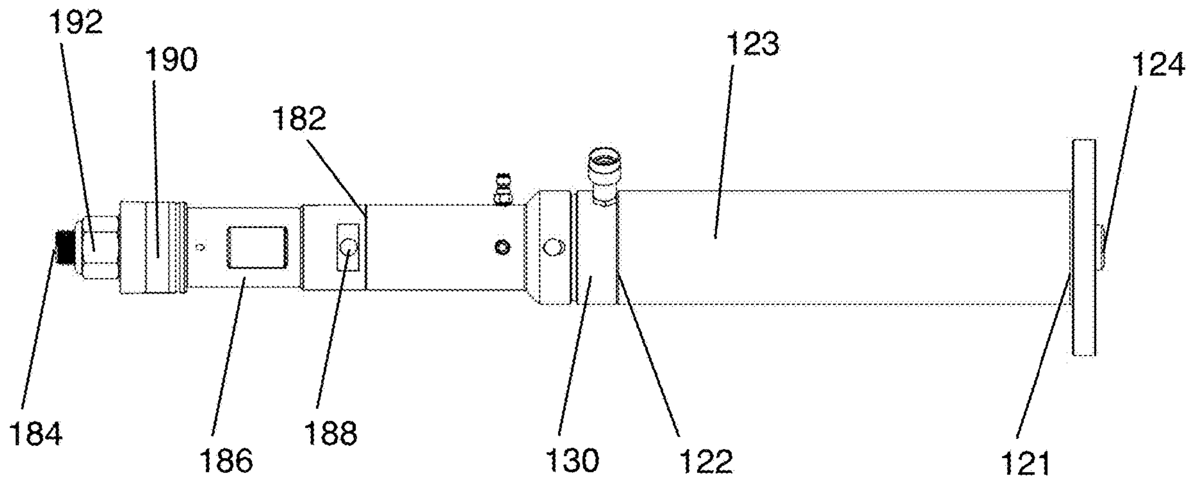
FIG. 13 is a side view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 14:
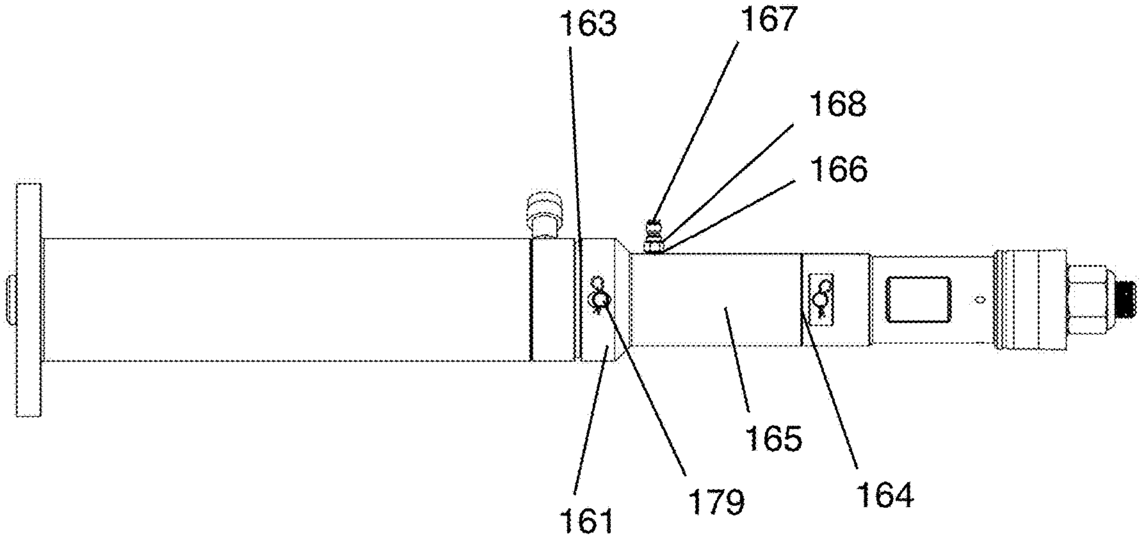
FIG. 14 is a side view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 15:
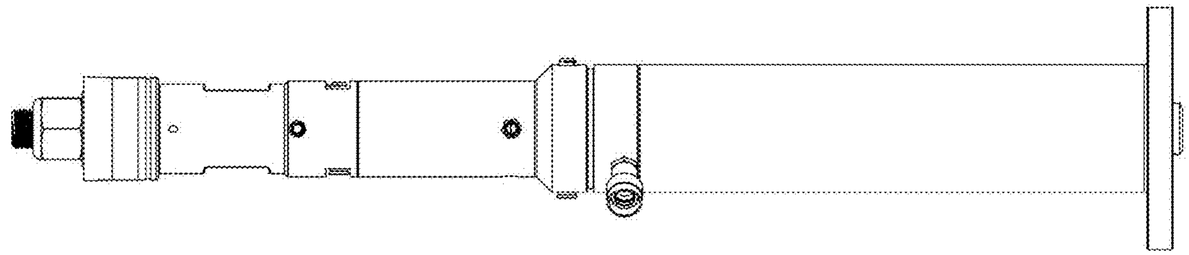
FIG. 15 is a top view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 16:
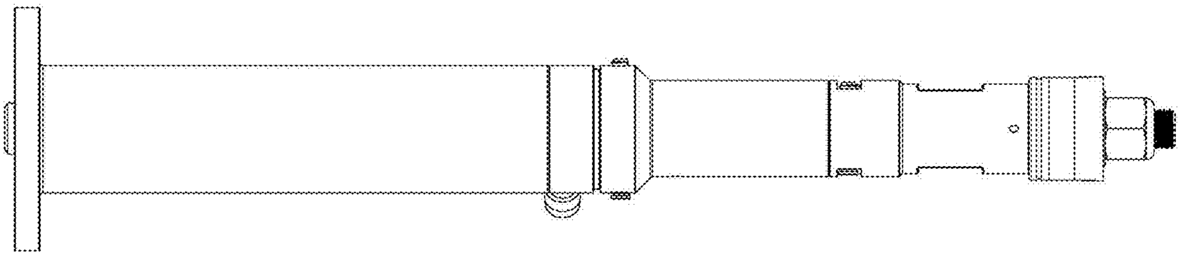
FIG. 16 is a bottom view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 17:
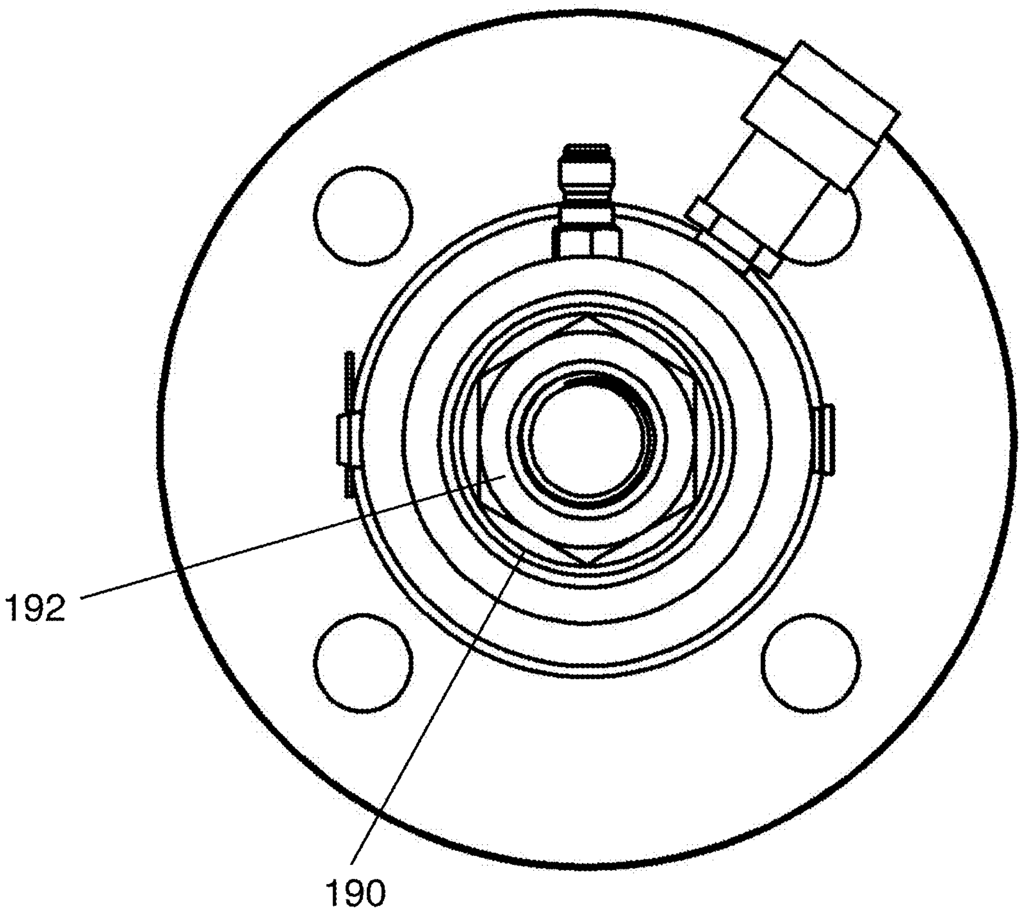
FIG. 17 is a front view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 18:
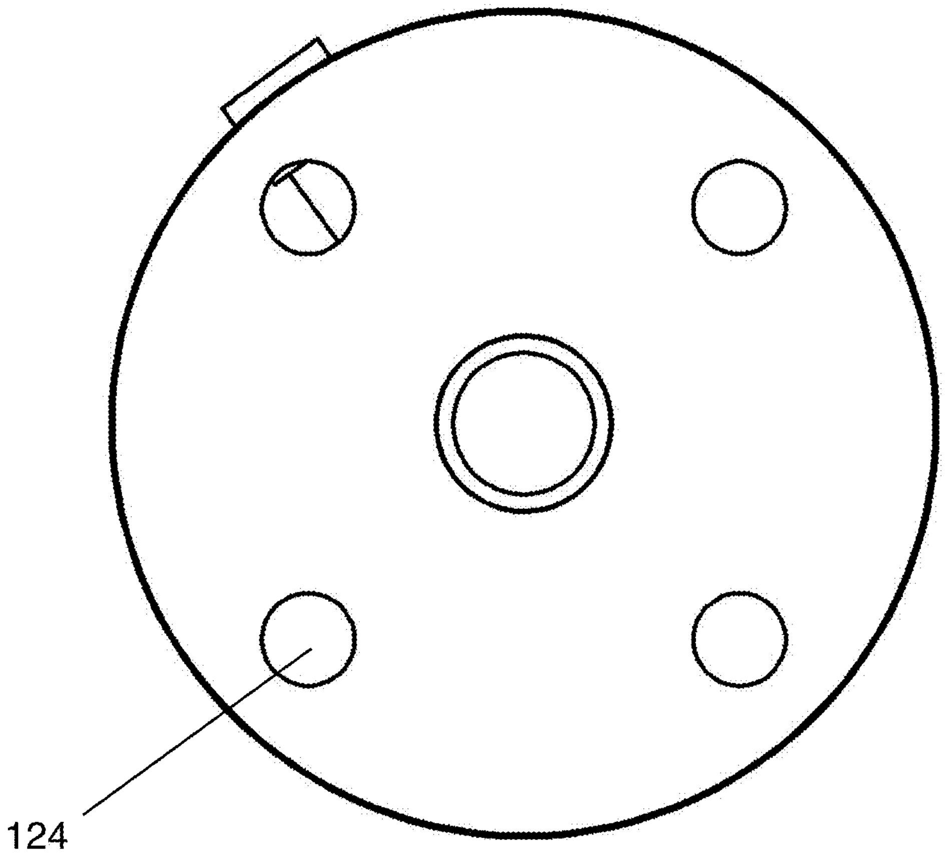
FIG. 18 is a rear view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 19:
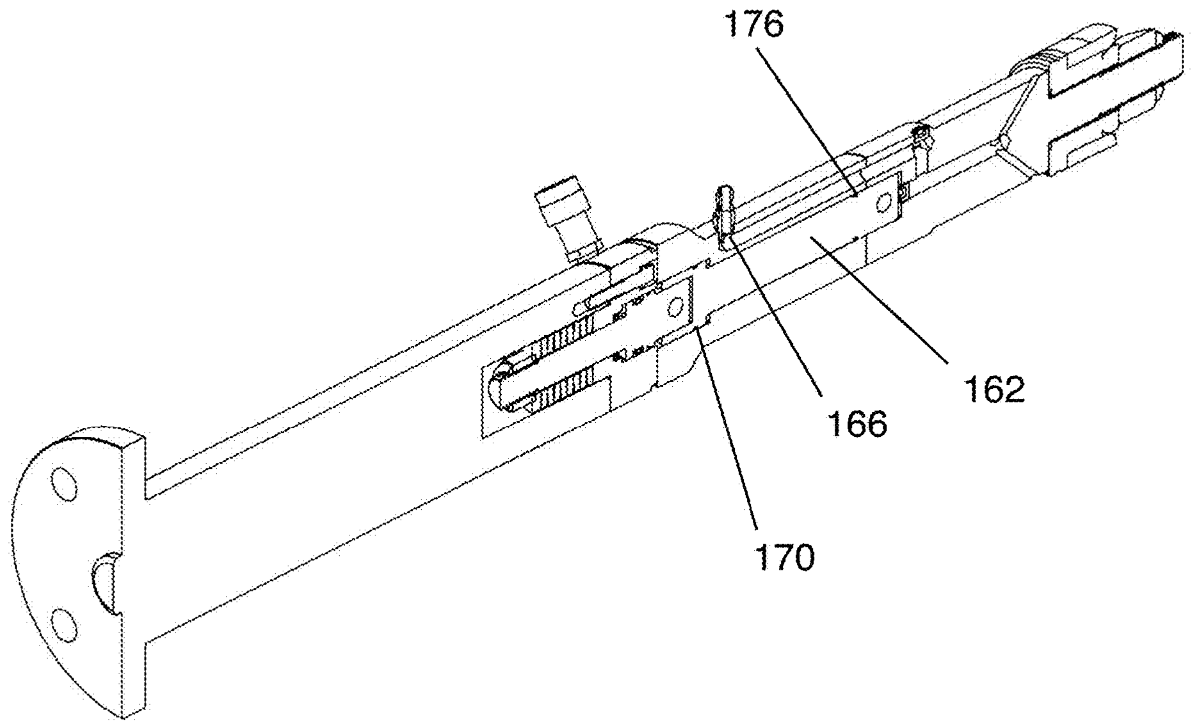
FIG. 19 is a top, perspective isometric cross-sectional view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.

Extension Rod:

In the arrangement shown, as one example, system 100 includes an extension rod 120. Extension rod (or "extension rod assembly") 120 is formed of any suitable size, shape, and design, and is configured to serve as one of a series of components in a rod column connecting the piston to the crosshead. Extension rod includes a number of features, reference FIG. 13 and others.

In the arrangement shown, as one example, the extension rod 120 is an elongated rod extending a length from a first end 121 to a second end 122 having an exterior surface 123 and a plurality of attachment features 124 (of the first end) and a plurality of attachment features 125 (of the second end). The extension rod also includes a flange 128 on the first end and the second end also includes a replaceable end or replaceable configuration. In the arrangement shown, as one example, the extension rod may also include a splash shield 131. In the arrangement shown, the second end 122 of the extension rod assembly 120 includes a plurality of attachment features 126. In the arrangement shown, the attachment features 126 of the second end 122 include threads and/or a threaded connection, and a counterbore. The threaded connections and counterbore provide a unique advantage over the existing state of the art which is well known for using clamp or pin connections.

End Cap Assembly: In the arrangement shown, as one example, extension rod 120 includes a removable end cap assembly 140. In one example, as shown, the end cap assembly 140 is secured and/or fastened to the primary extension rod 120 with 12 point capscrews.

In the arrangement shown, as one example, the end cap assembly 140 can be removed as a complete unit. This is effective for cost and time savings, especially in cases where the end cap assembly needs repair, maintenance, or replacement. Another benefit and advantage shown in the present disclosure is that the end cap assembly can be replaced, with the present system.

Figure 20:
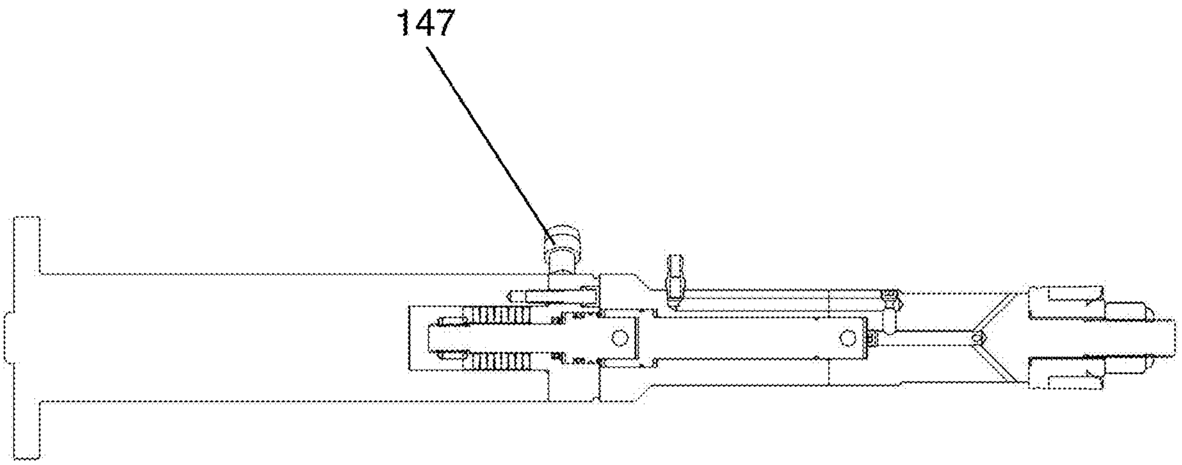
FIG. 20 is a cross-section view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 21:
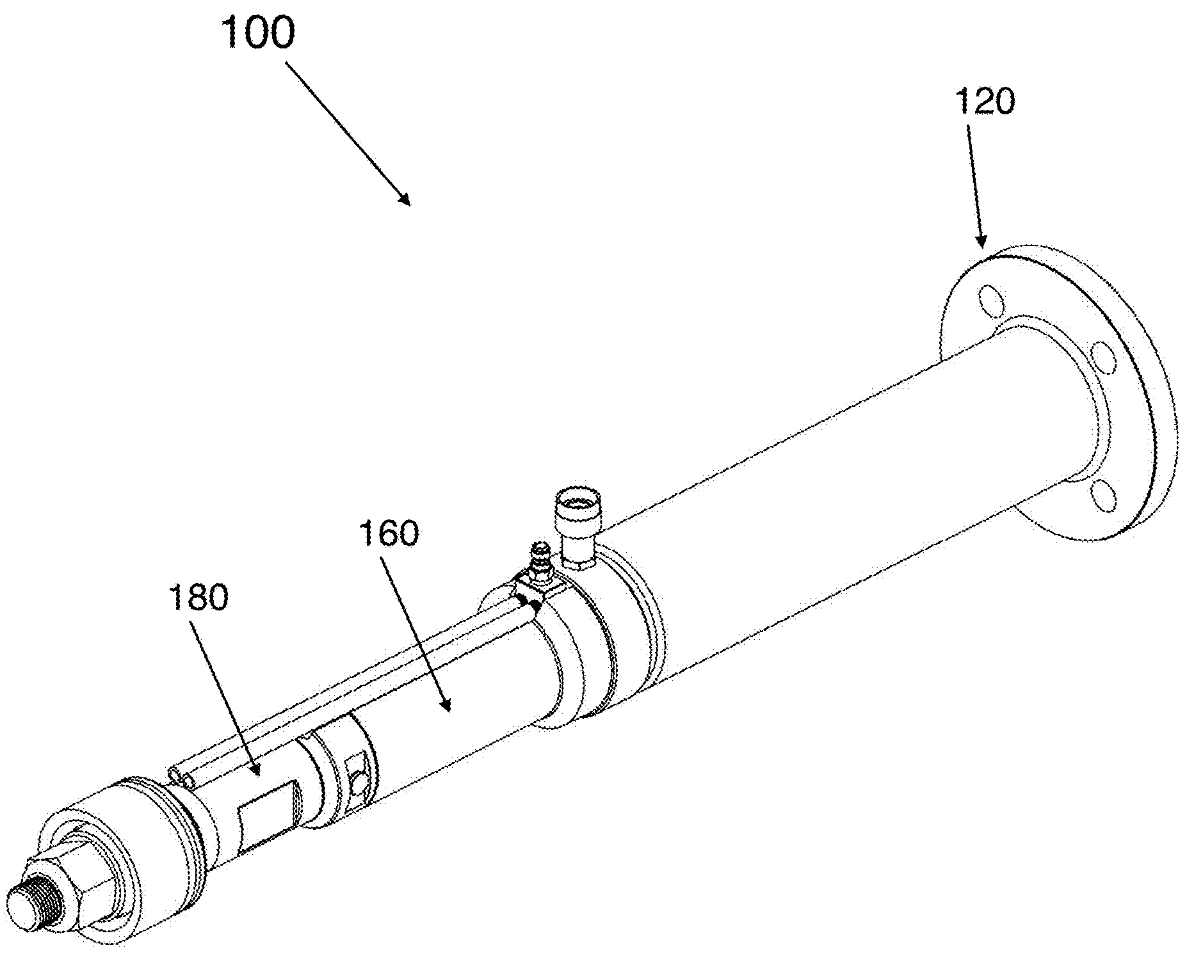
FIG. 21 is a top, perspective view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 22:
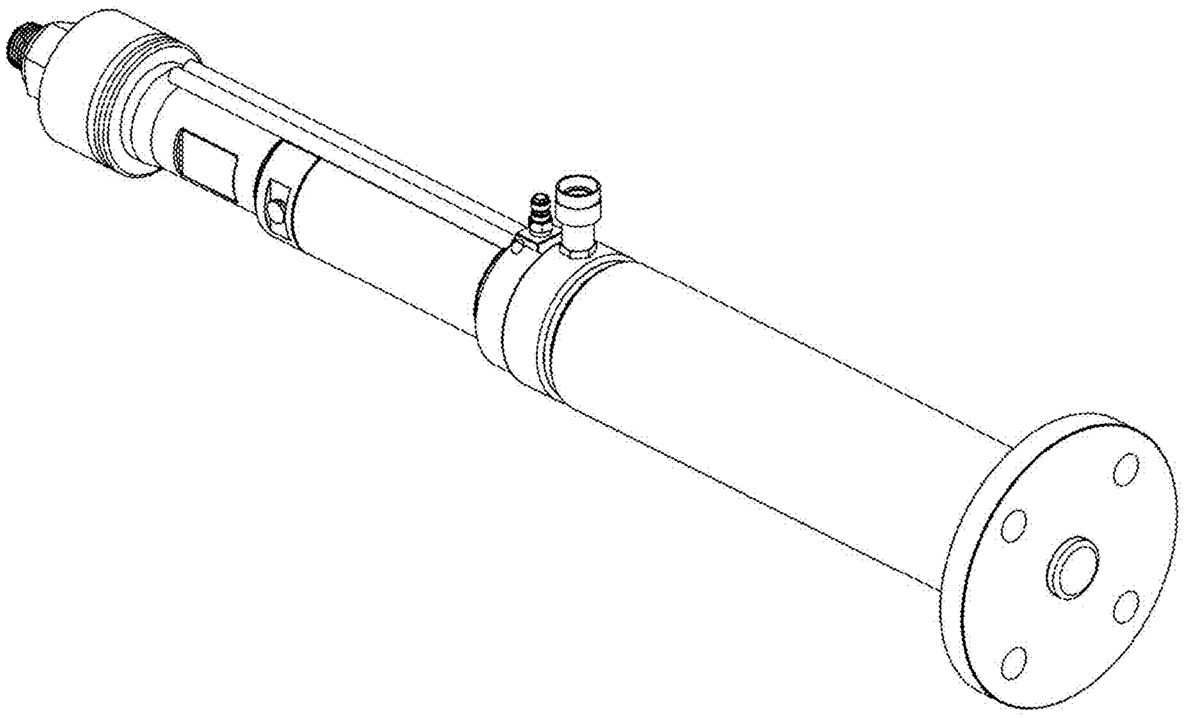
FIG. 22 is a top, perspective view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 23:
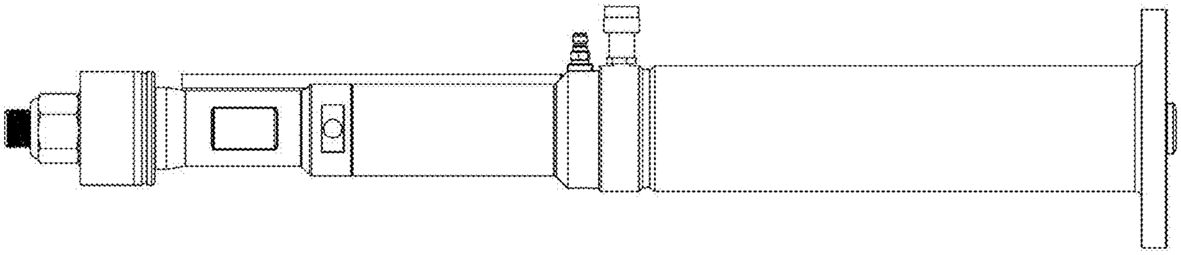
FIG. 23 is a side view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 24:
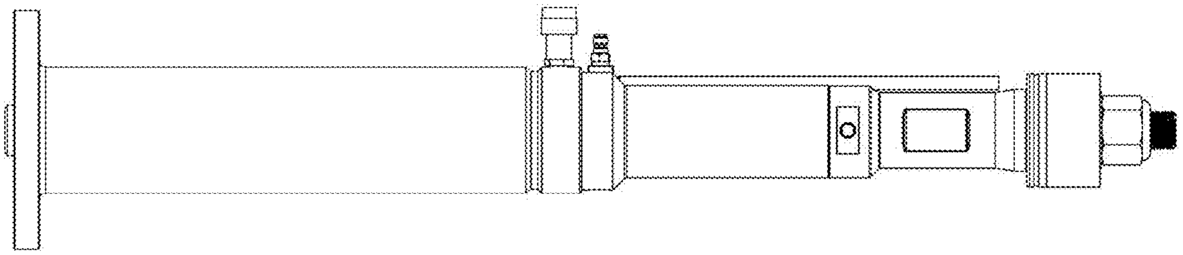
FIG. 24 is a side view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 25:
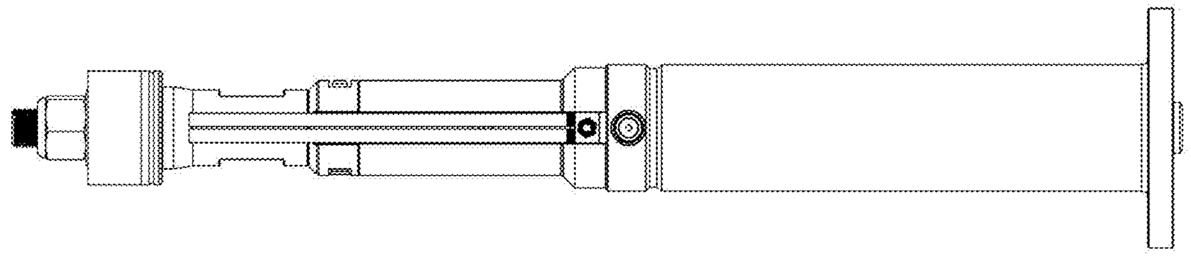
FIG. 25 is a top view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 26:
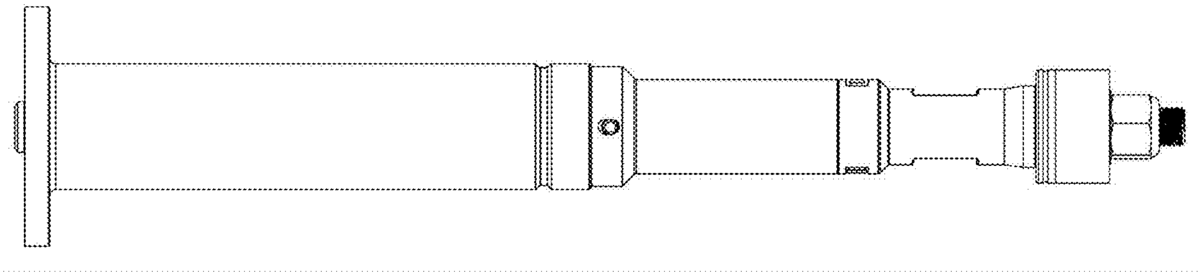
FIG. 26 is a bottom view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 27:
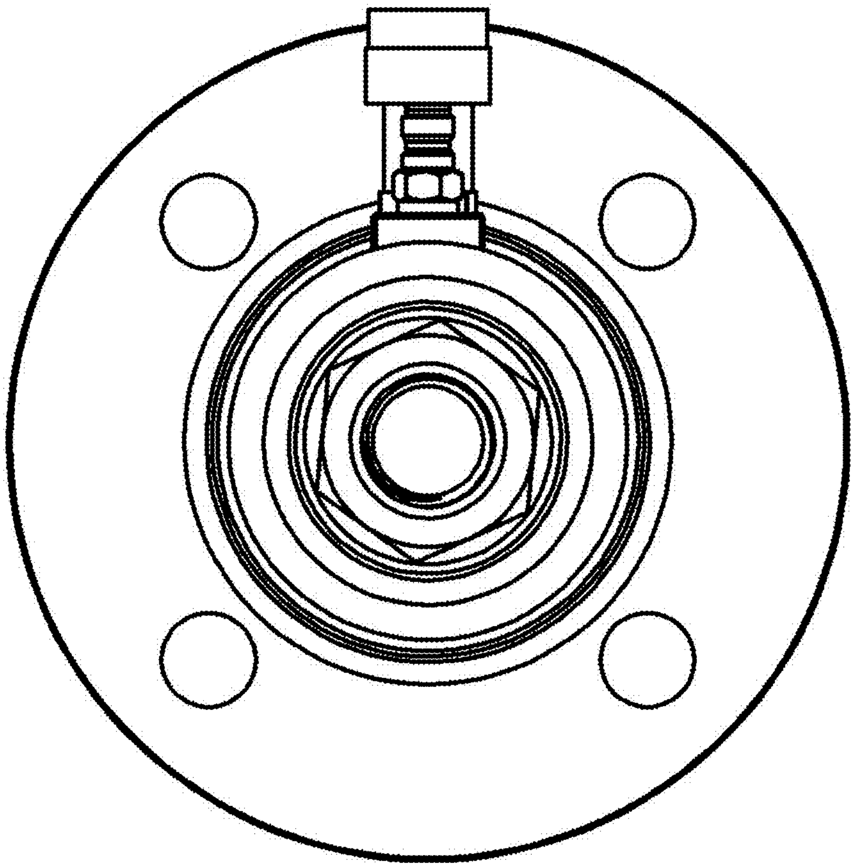
FIG. 27 is a front view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 28:
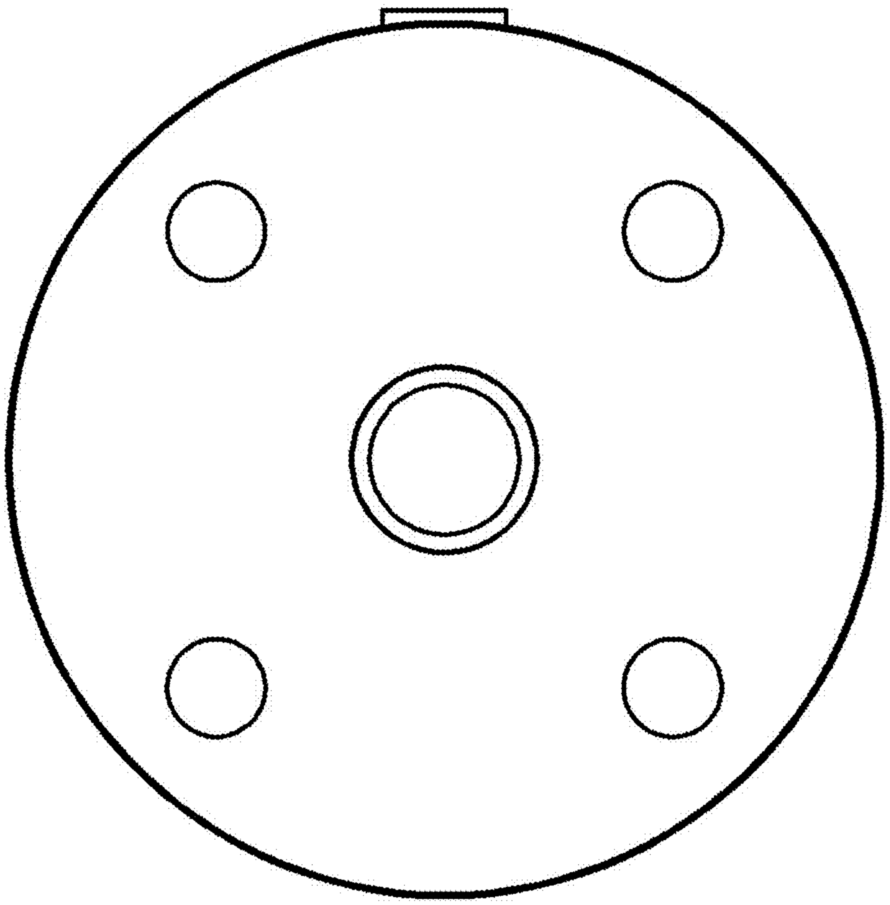
FIG. 28 is a rear view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 29:
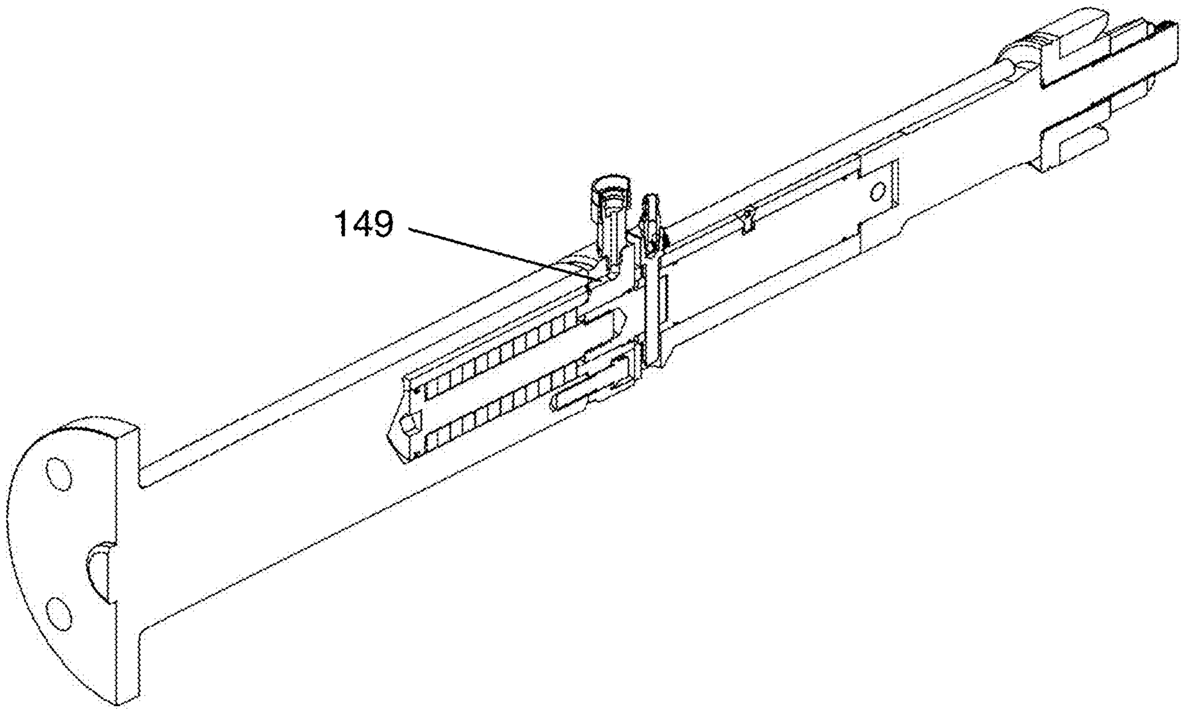
FIG. 29 is a top, perspective isometric cross-sectional view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 30:
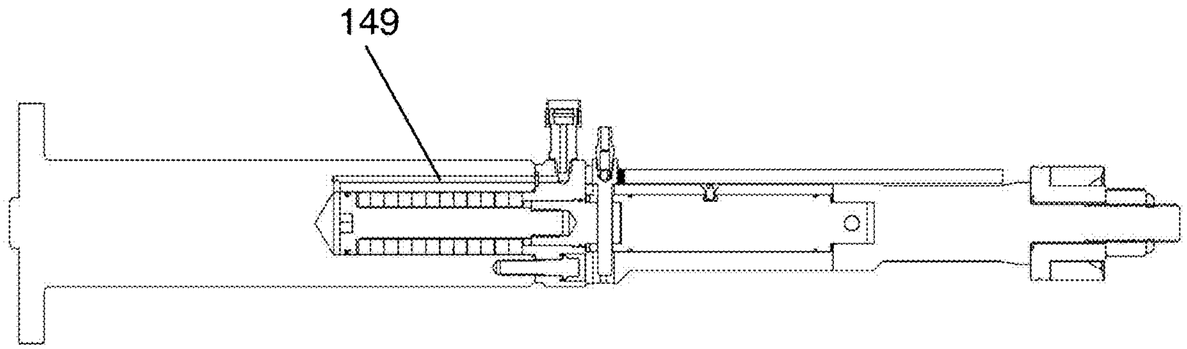
FIG. 30 is a cross-section view of the hydraulic actuated rod column assembly with a piston; the view showing a hydraulically actuated arrangement; the view showing an extension rod, a subrod, and a piston rod assembly; the view showing an extension rod; the view showing a subrod assembly, the view showing a piston rod assembly.
Figure 31:
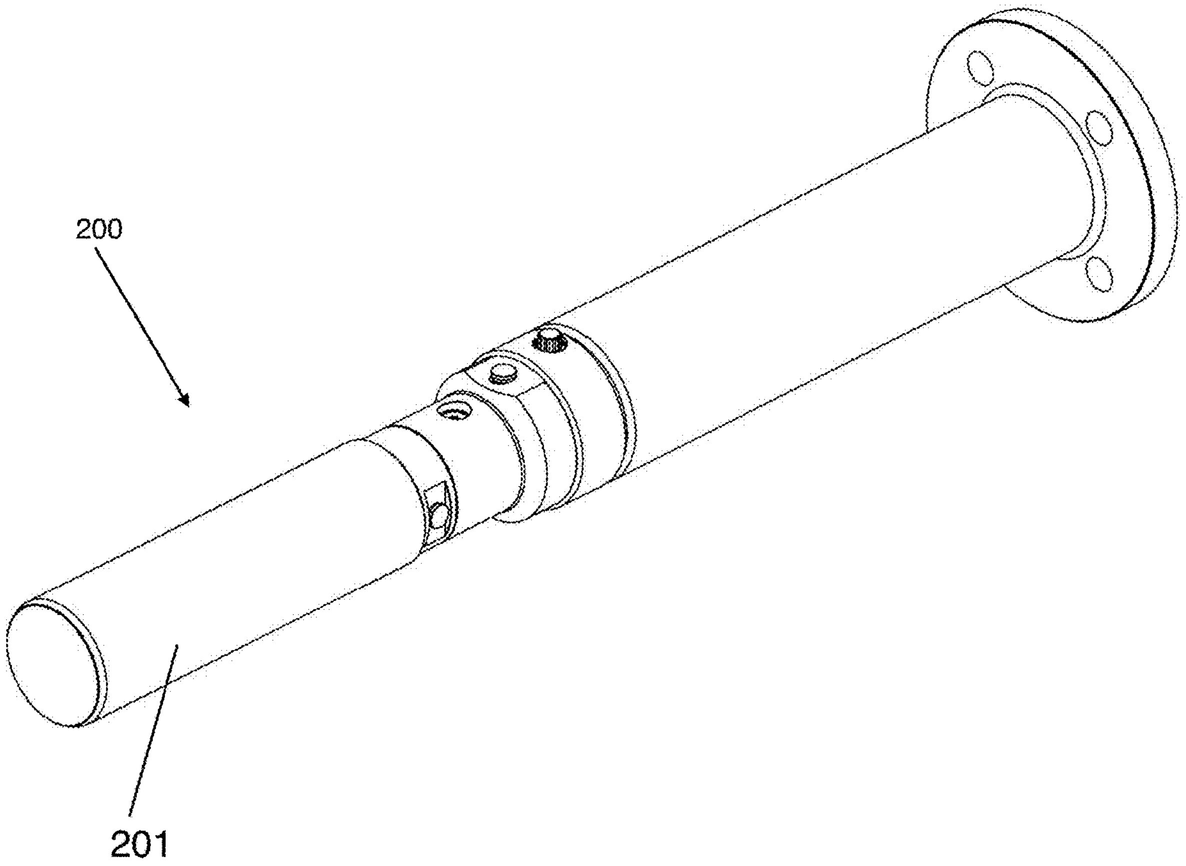
FIG. 31 is a top, perspective view of the wedge bolt actuated modular reciprocating pump rod column system, a rod column assembly; the view showing a plunger rod column assembly; the view showing an extension rod assembly; the view showing a subrod assembly; the view showing a plunger.
Figure 32:
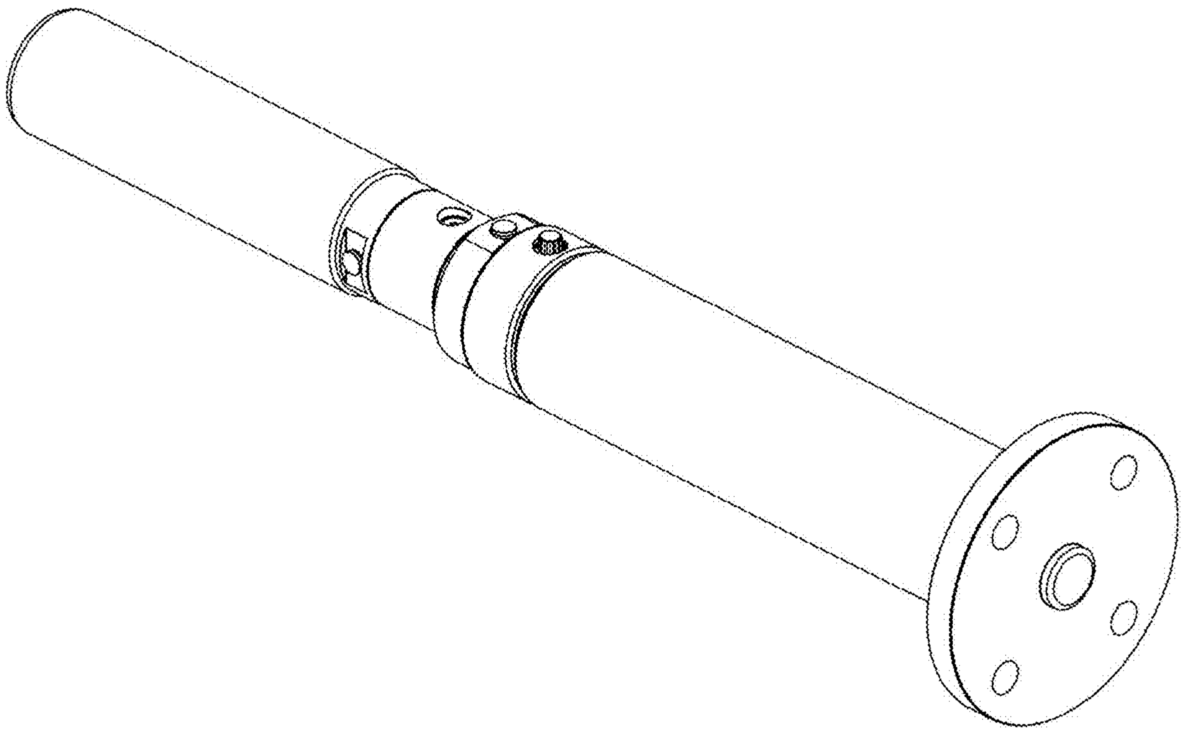
FIG. 32 is a top, perspective view of the wedge bolt actuated modular reciprocating pump rod column system, a rod column assembly; the view showing a plunger rod column assembly; the view showing an extension rod assembly; the view showing a subrod assembly; the view showing a plunger.
Figure 33:
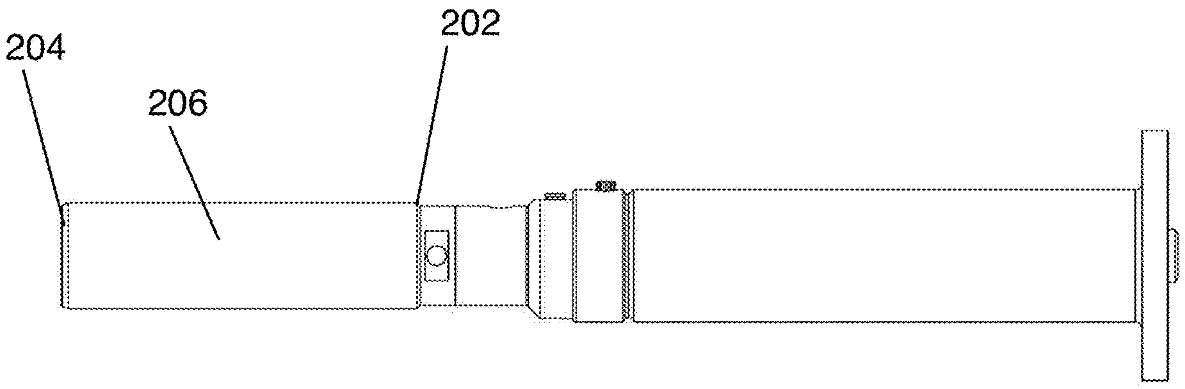
FIG. 33 is a side view of the wedge bolt actuated modular reciprocating pump rod column system, a rod column assembly; the view showing a plunger rod column assembly; the view showing an extension rod assembly; the view showing a subrod assembly; the view showing a plunger.
Figure 34:
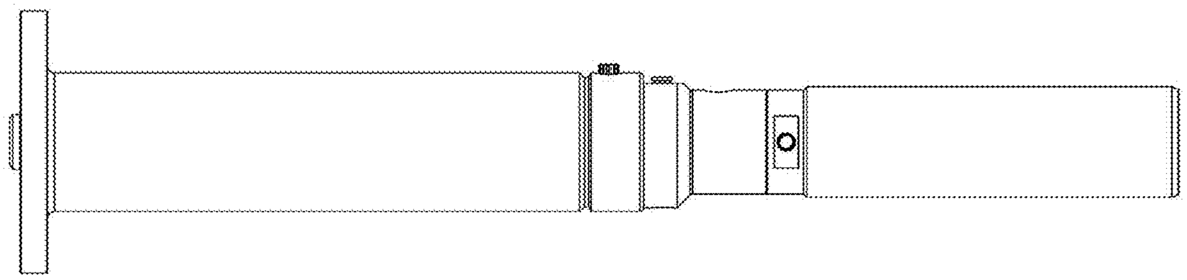
FIG. 34 is a side view of the wedge bolt actuated modular reciprocating pump rod column system, a rod column assembly; the view showing a plunger rod column assembly; the view showing an extension rod assembly; the view showing a subrod assembly; the view showing a plunger.
Figure 35:
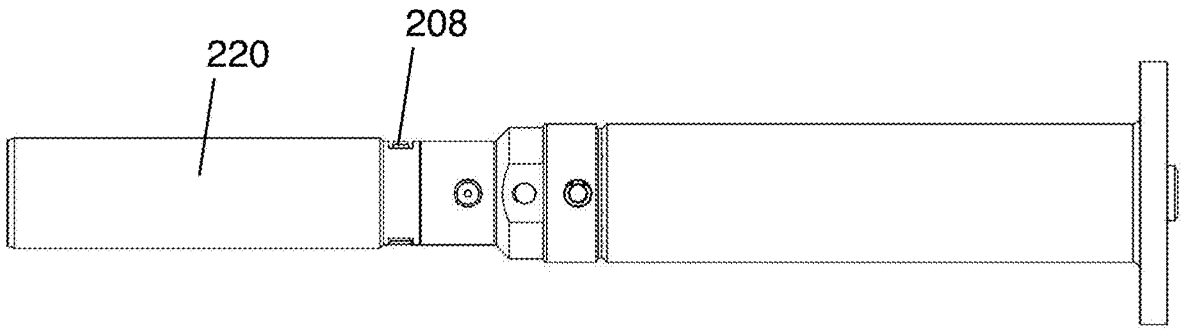
FIG. 35 is a top view of the wedge bolt actuated modular reciprocating pump rod column system, a rod column assembly; the view showing a plunger rod column assembly; the view showing an extension rod assembly; the view showing a subrod assembly; the view showing a plunger.
Figure 36:
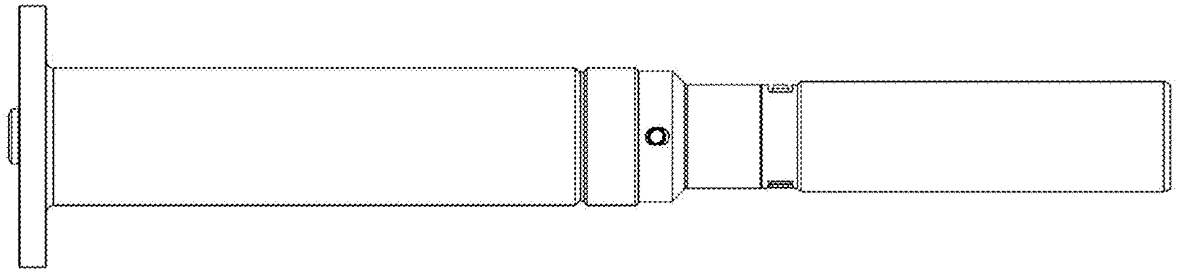
FIG. 36 is a bottom view of the wedge bolt actuated modular reciprocating pump rod column system, a rod column assembly; the view showing a plunger rod column assembly; the view showing an extension rod assembly; the view showing a subrod assembly; the view showing a plunger.
Figure 37:
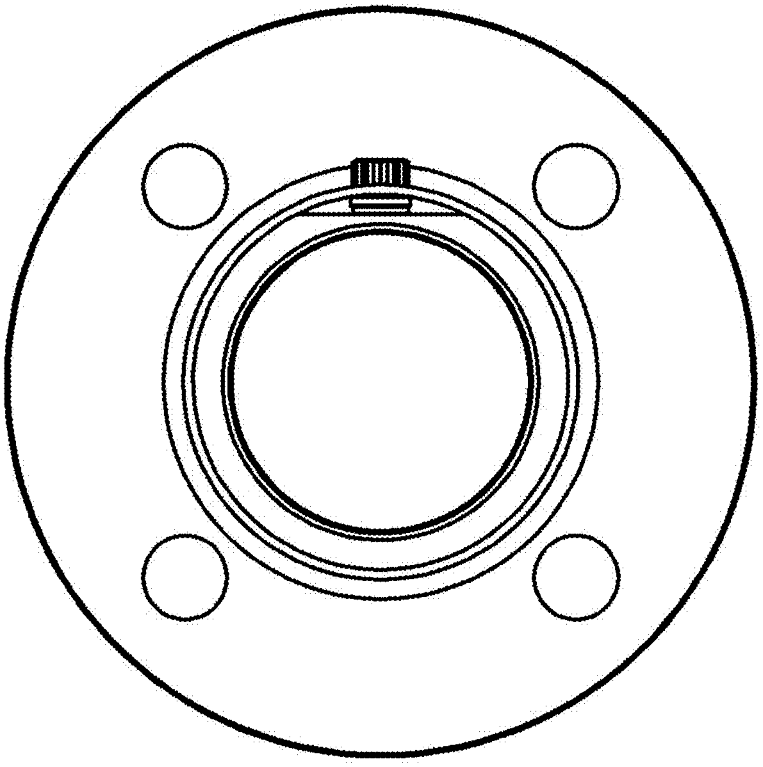
FIG. 37 is a front view of the wedge bolt actuated modular reciprocating pump rod column system, a rod column assembly; the view showing a plunger rod column assembly; the view showing an extension rod assembly; the view showing a subrod assembly; the view showing a plunger.
Figure 38:
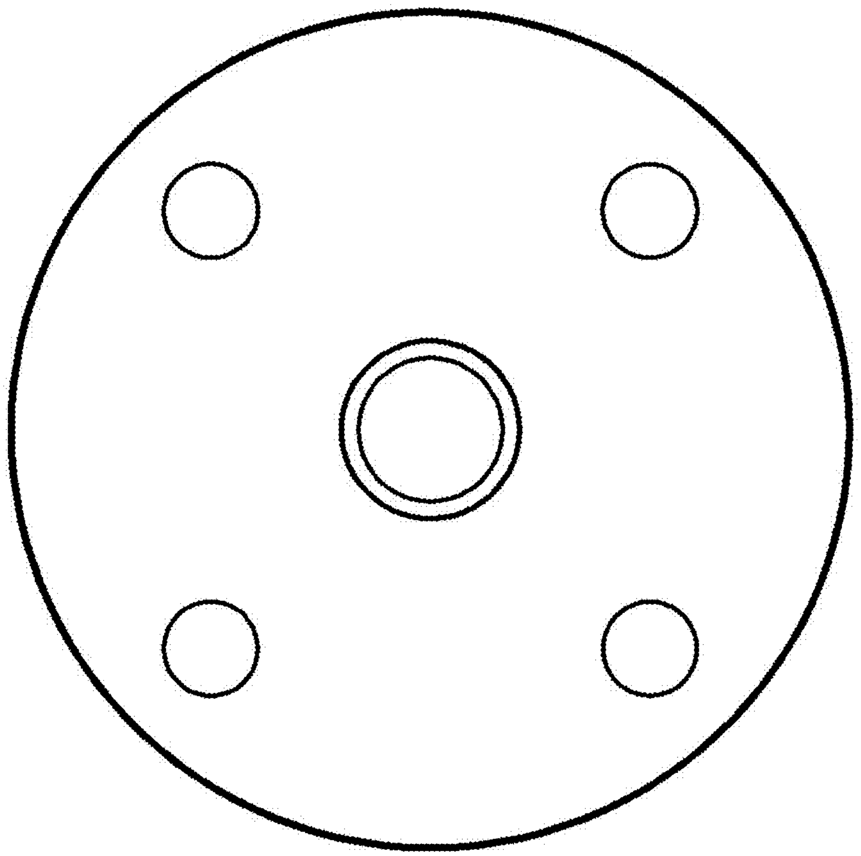
FIG. 38 is a rear view of the wedge bolt actuated modular reciprocating pump rod column system, a rod column assembly; the view showing a plunger rod column assembly; the view showing an extension rod assembly; the view showing a subrod assembly; the view showing a plunger.
Figure 39:
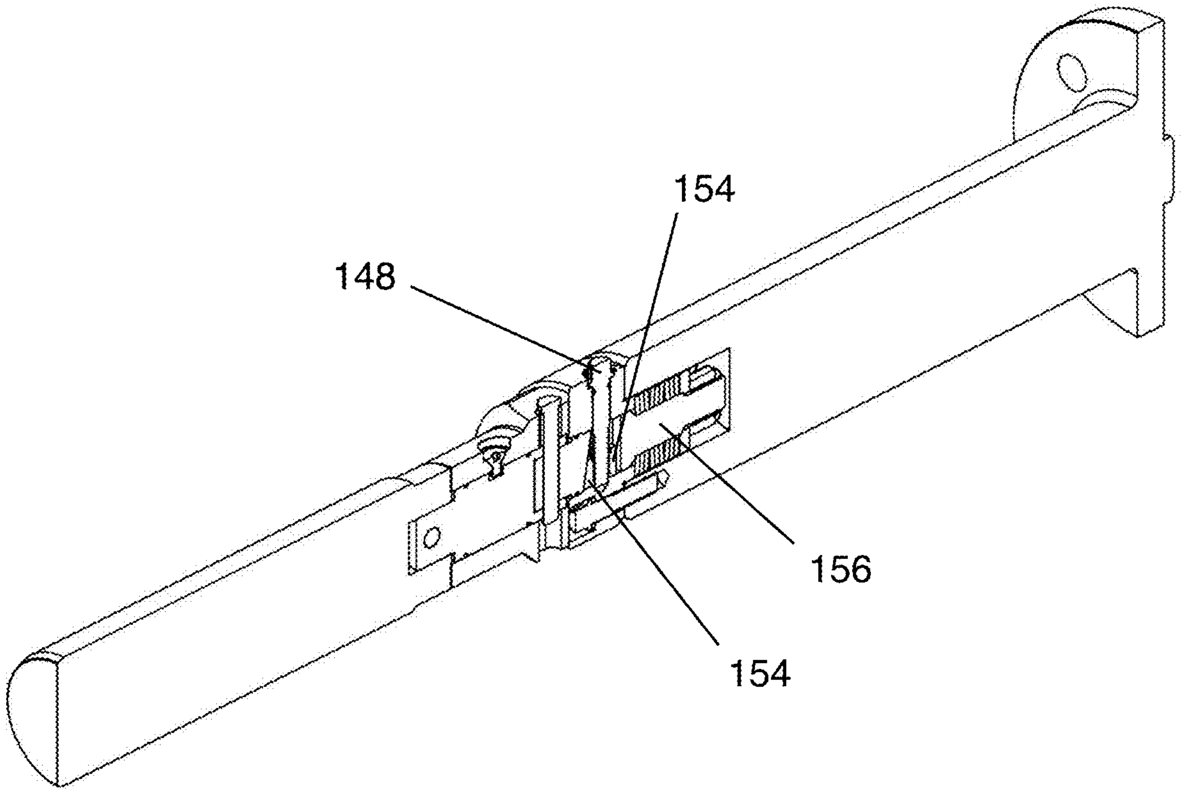
FIG. 39 is a top, perspective isometric cross-sectional view of the wedge bolt actuated modular reciprocating pump rod column system, a rod column assembly; the view showing a plunger rod column assembly; the view showing an extension rod assembly; the view showing a subrod assembly; the view showing a plunger.
Figure 40:
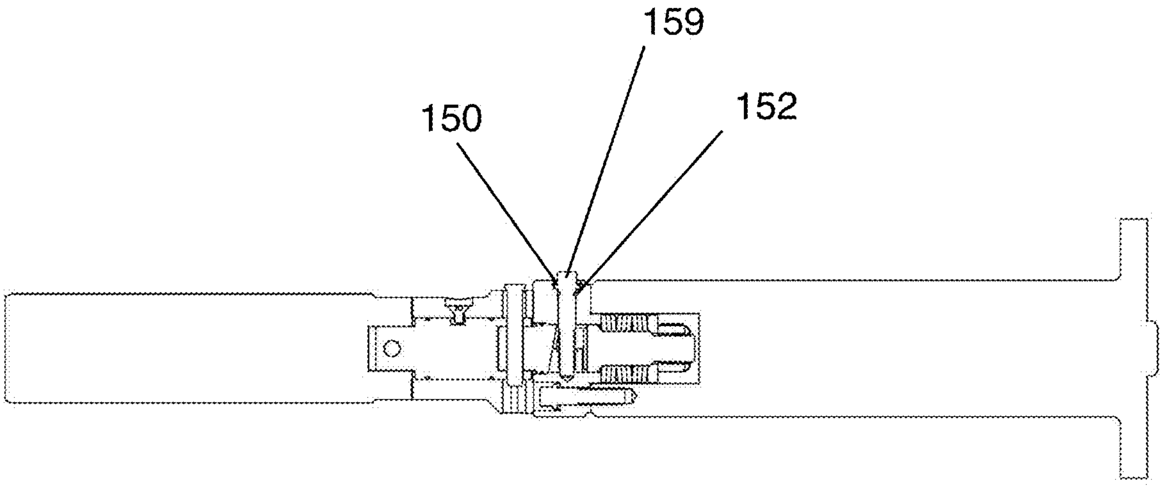
FIG. 40 is a cross-section view of the wedge bolt actuated modular reciprocating pump rod column system, a rod column assembly; the view showing a plunger rod column assembly; the view showing an extension rod assembly; the view showing a subrod assembly; the view showing a plunger.
Figure 41:
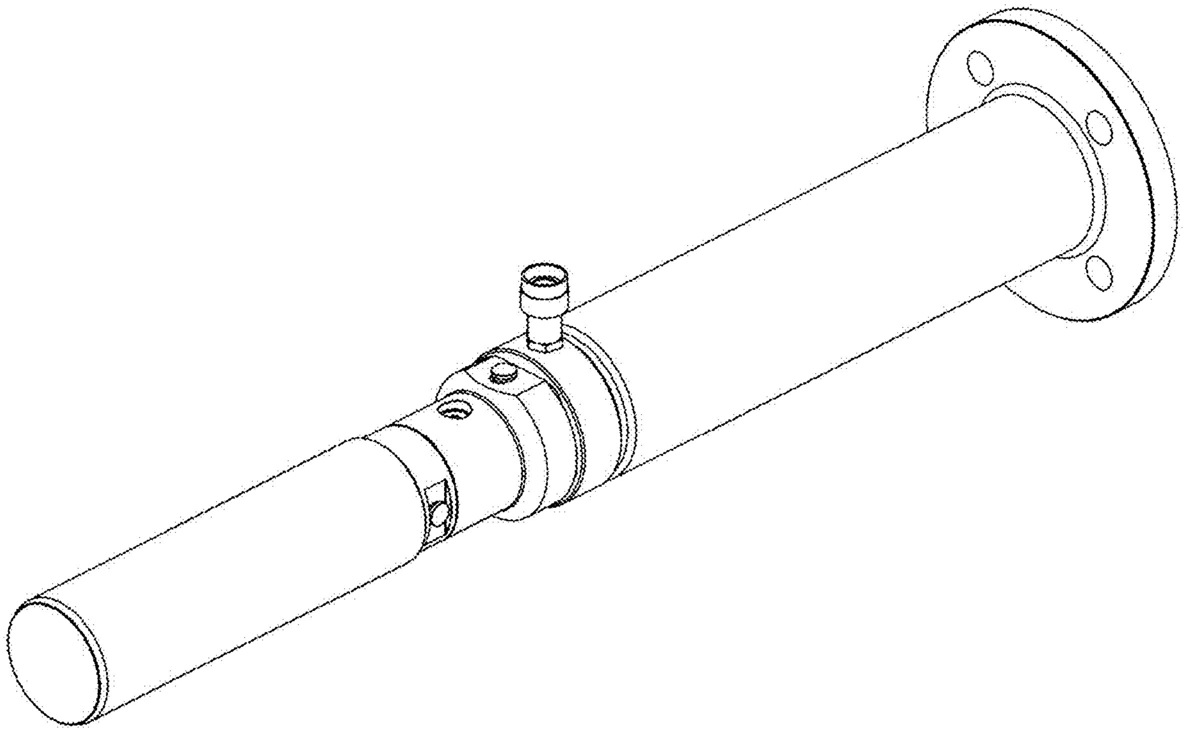
FIG. 41 is a top, perspective view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 42:
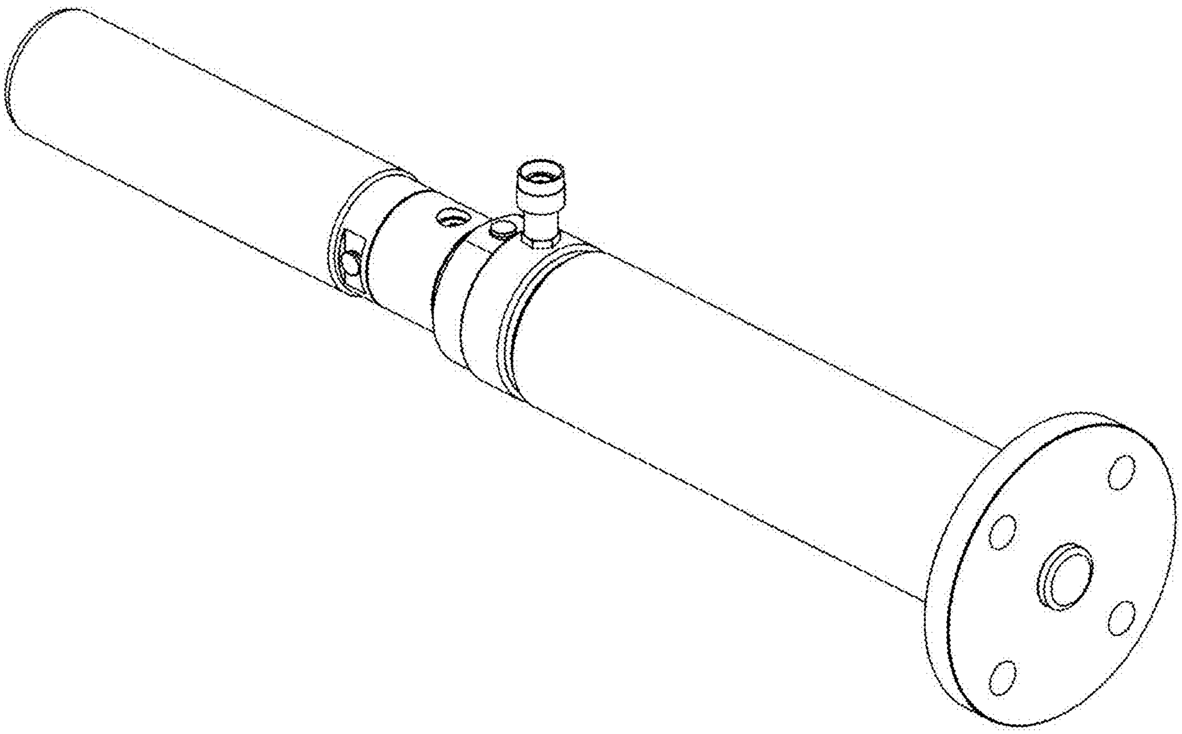
FIG. 42 is a top, perspective view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 43:
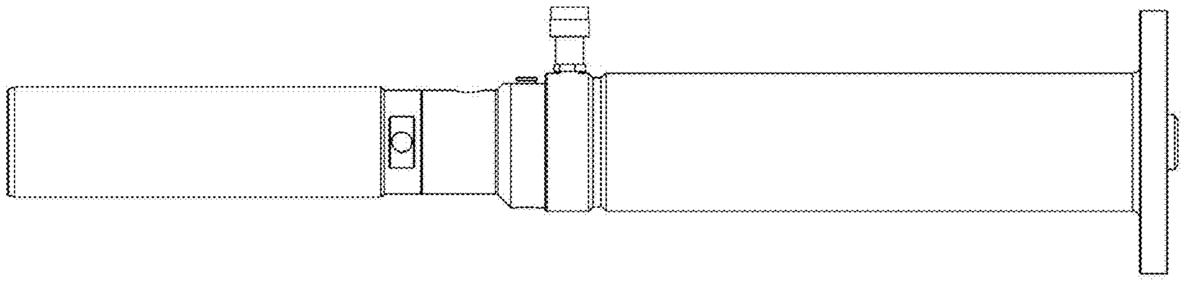
FIG. 43 is a side view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 44:
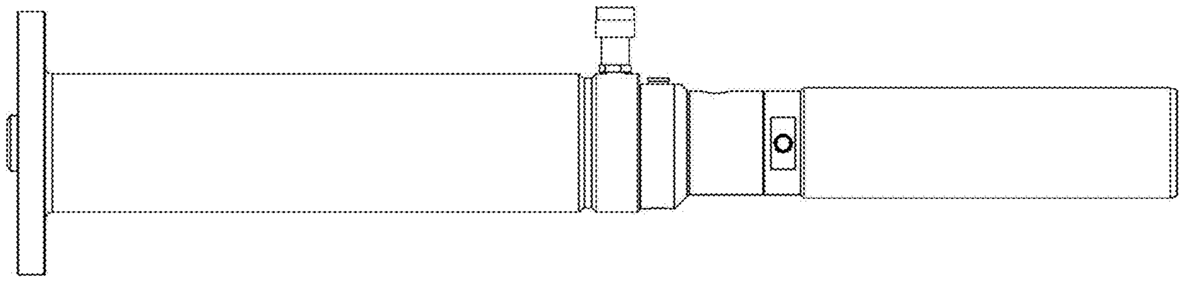
FIG. 44 is a side view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 45:
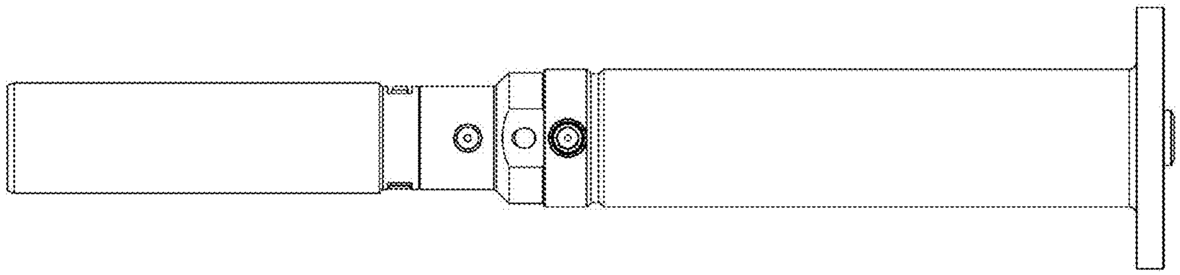
FIG. 45 is a top view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 46:
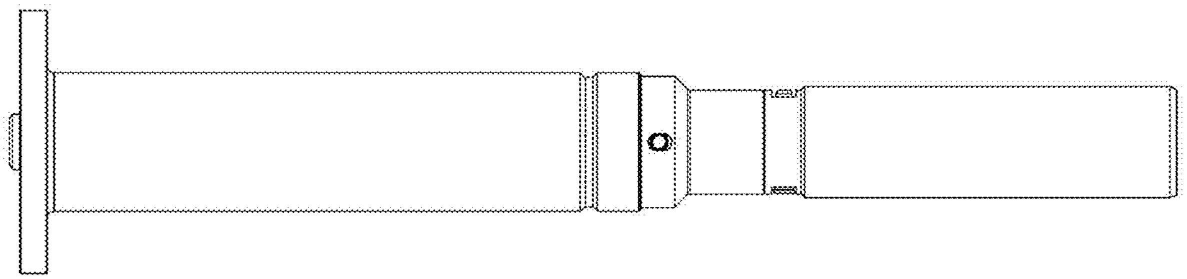
FIG. 46 is a bottom view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 47:
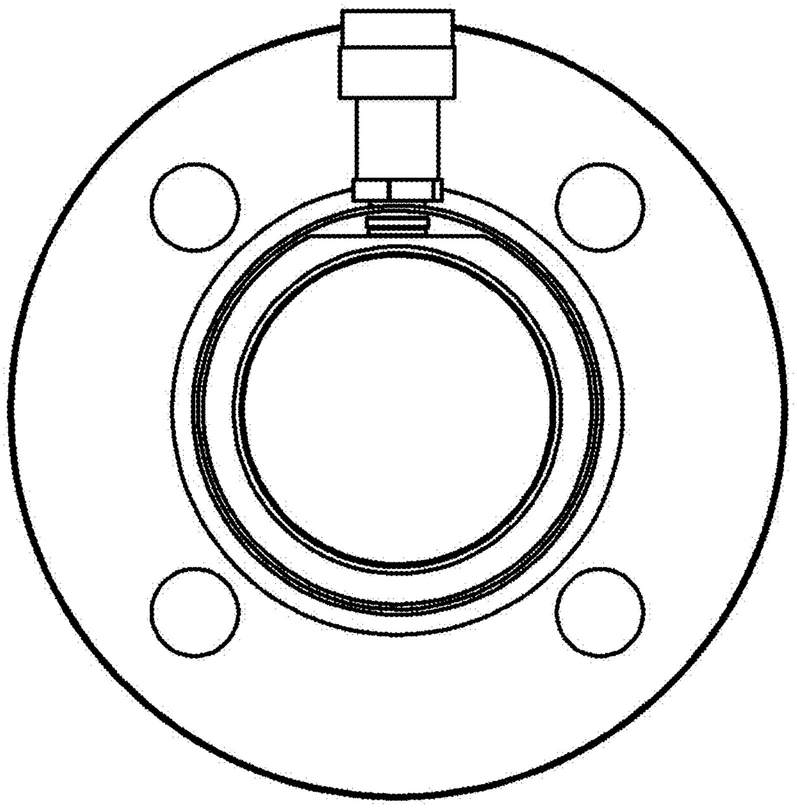
FIG. 47 is a front view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 48:
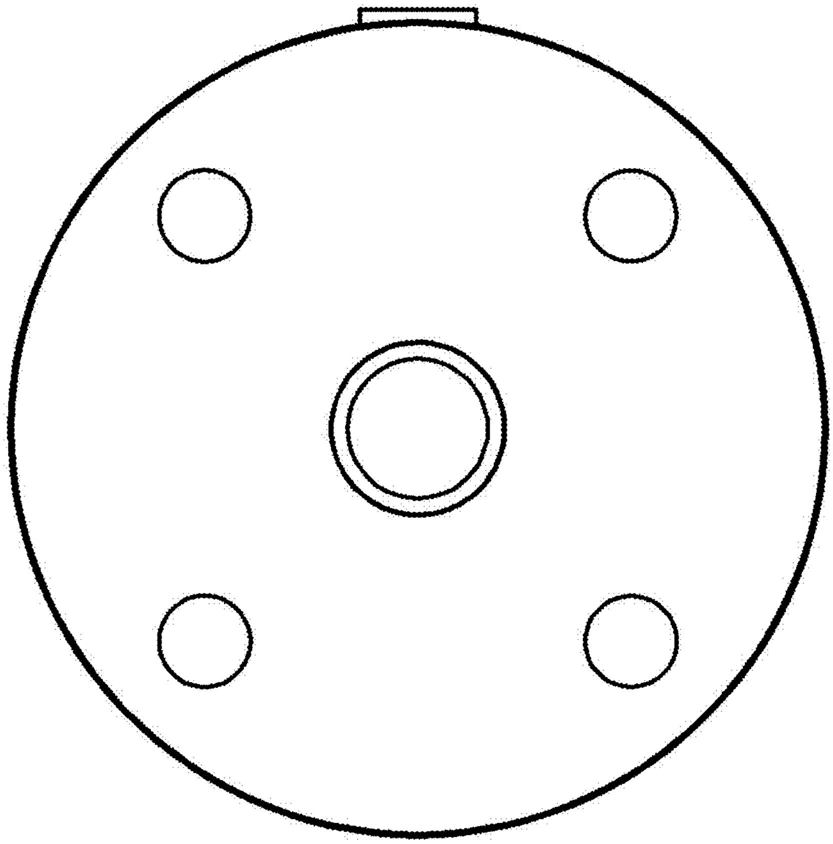
FIG. 48 is a rear view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.

In the arrangement shown, as one example, and specifically with reference to FIGS. 20 and 21, an end cap assembly cross section of the extension rod, is shown. In the arrangement, bellville springs, or springs, or disc springs 143, are installed on the inside portion of the inner shaft (or "center shaft") 156 followed by a retainer plate (or "spacer") and lock nut 141. The integral wedge assembly 154 is driven up and down by a 12-point capscrew (or "capscrew") 159 (or 259) and/or wedge bolt 148, in the example.

Furthermore, a snap ring (or "retaining ring") 150 is installed above the head flange of the capscrew which prevents the capscrew from being unscrewed or dislodged from the assembly. Furthermore, o-rings 144/152/157 are installed on the inner shaft, end cap, and wedge bolt locations to prevent contaminations from entering the shaft and/or spring area.

Loosening: In this arrangement, when the cap screw or wedge bolt is loosened, the wedge is forced downward causing and/or allowing the spring pack to extend. As the spring pack extends, an axial load to the shaft is caused which forces the shaft to retract.

Tightening: In this arrangement, when the cap screw or wedge bolt is tightened, the wedge is forced upward causing the shaft to move forward while compressing the spring pack. In this way, the shaft moving forward forces removal of the cross pins fastening the subrod to the extension rod and piston rod.

In the arrangement shown, as one example, the end cap assembly includes a lock nut 141, a spacer 142, disc rings 143, o-rings 144/152/157, an end cap 146 (having a wedge bolt inset 145 in some embodiments), a wedge bolt 148, a snap ring 150, a wedge 154 (the wedge having a wedge inset 155), a center shaft 156, a spring pack 158, and a plurality of capscrews, among other features and components.

In the arrangement shown, and specifically with reference to FIG. 7875, the end cap 146 also includes a keyway 151. In the arrangement, the keyway 151 is configured to line-up or place in line an end cap for securement and ease of lining up capscrew apertures and the like, dramatically improving on ease of assembly.

In another arrangement shown, with reference to FIG. 7674, the end cap assembly 240 includes a piston 244, piston seal 242, disc springs 246, hydraulic fittings 248, an end cap 250, a center shaft 252, a pin-hole of the center shaft 253, an o-ring of the center shaft 254, and a piston shaft 254, and a thread of the piston shaft 255, and a hydraulic port of the end cap assembly 260, and a hydraulic cross port of the end cap assembly 266.

Subrod:

In the arrangement shown, as one example, system 100 includes a subrod 160 (also referred to as a "subrod assembly"). Subrod assembly 160 is formed of any suitable size, shape, and design, and is configured to connect the piston and extension rod.

In the arrangement shown, as one example, subrod 160 consists of an outer housing 161, a shaft 165, and an inner shaft 162. A set screw 168 may be installed in the water tube recess 166 engages a slot 174 in the inner shaft to retain the inner shaft in the outer housing. The water tube recess 166 is designed and configured to accepted the water tube port 167. In the arrangement shown, o-rings 170/176 are installed on the inner shaft 162 to prevent contaminants from entering the subrod.

A transition slot 174 in the outer housing and hole drilled through the counterbore of the center shaft allows the rear pin 194 to be installed, fastening the subrod to the extension rod. The forward end of the center shaft protrudes from the outer housing to engage the counterbore of the piston rod 198. The forward center shaft also contains a cross hole for installation of the front pin 196.

Said another way, the slot 174 is configured to receive a retainer screw 175. Alternatively, the slot 207 is configured to receive a retainer screw 208 (in a plunger configuration).

Piston Rod Assembly:

In the arrangement shown, as one example, system 100 includes a piston rod assembly 180. Piston rod 180 is formed of any suitable size, shape, and design, and is configured to be compatible with current pin style rod systems and uses pilot and cross pin interfaces.

Plunger:

In the arrangement shown, as one example, system 100 can be adapted for use with a plunger 201 and/or packing. As temperatures increase in some operations and/or pressures increase in some operations, a plunger and/or packing become desirable. The present system 100 provides the state of the art with a system which can be adapted to accept a plunger and/or packing on the rod column assembly by replacement instead of replacing the entire machine and/or the entire rod column assembly.

In the existing art, subrods hold the force generating components of rod column assemblies. This makes shortening a subrod very difficult to impossible. The present system is able to provide for a short subrod due to the design of the subrod and the transfer of forces. In this way, the shorter subrod provides for adaptation of a plunger and/or installation of a plunger and/or packing. In this way, system 100 provides for a plunger retrofit in a rod column assembly.

Alternatively, and said another way, system 100 also provides for subrod replacement with a longer or shorter unit for plunger or non plunger applications, depending on the operation. In this way, the extension rod of the rod assembly can be utilized with both pistons and plungers. In this way, maintenance, repairs, and operations are dramatically reduced in cost and time effectiveness.

Hydraulically Operated End Cap Assembly 200:

In the arrangement shown, as one example, and specifically with reference to FIGS. 41-50, a hydraulically operated or hydraulic actuated extension rod with plunger 201 are shown.

As with the wedge release end cap, the hydraulic operated end cap can be removed as a unit from the extension rod. In this arrangement, as one example, the center shaft includes and/or connects to a piston seal 242 and piston 244. The piston 244 engages and/or is engaged by hydraulic pressure added to or removed form the cavity 245 of the extension rod. The cavity 245 is hydraulically connected to the cross port. When pressure is applied through the hydraulic fittings 248 and/or hydraulic pressure injected, the disc springs 246 are compressed. In this embodiment, the end cap 250 is then caused to expand or more away from the extension rod, releasing; releasing the center shaft 252 allowing for maintenance and/or replacement.

Wear on the end surface of the extension rod to which the subrod is attached can prevent the system from tensioning the piston and subrod. The new invention allows this component to be replaced if wear or damage occur. This benefits the end user in that the time and cost associated with replacing the end cap assembly is less that replacing the entire extension rod.

The removable end cap also allows for use of alternate materials, heat treatment, and or surface treatments for the end cap that are different from those of the main body of the extension rod. The characteristics can be modified to reduce the potential for damage and wear on the end of the rod, this is not possible with the existing one-piece extension rod designs.

The plunger subrod shares the same design as the piston subrod, however it is shorter in length. The shorter length is required to accommodate the longer length of the plunger.

Figure 49:
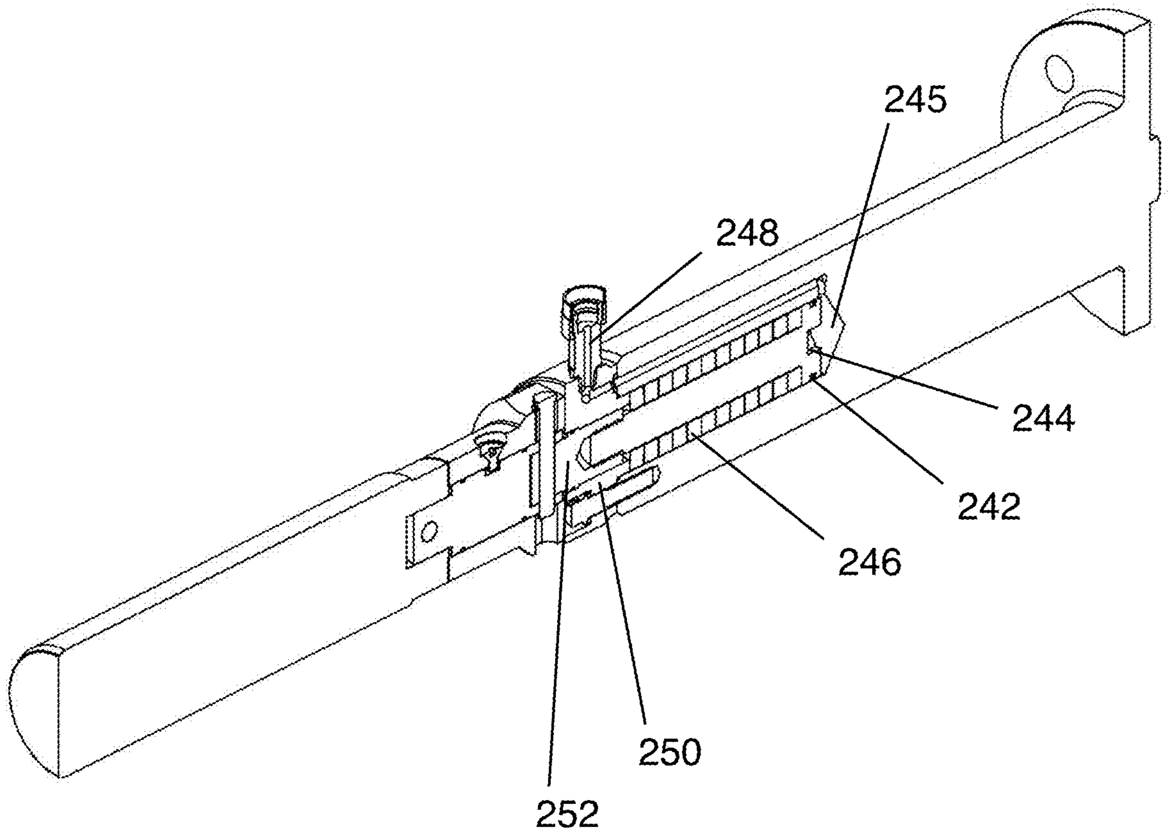
FIG. 49 is a top, perspective isometric cross-sectional view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 50:
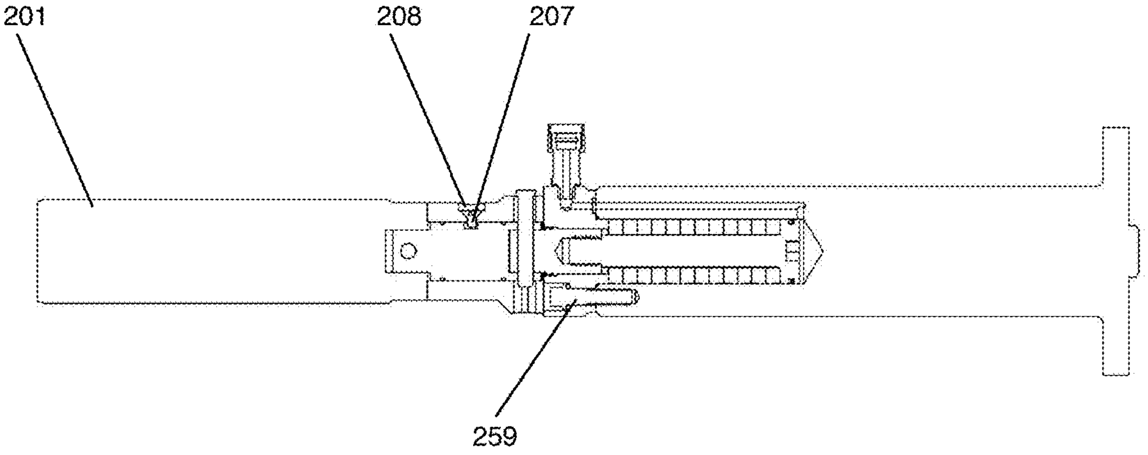
FIG. 50 is a cross-section view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 51:
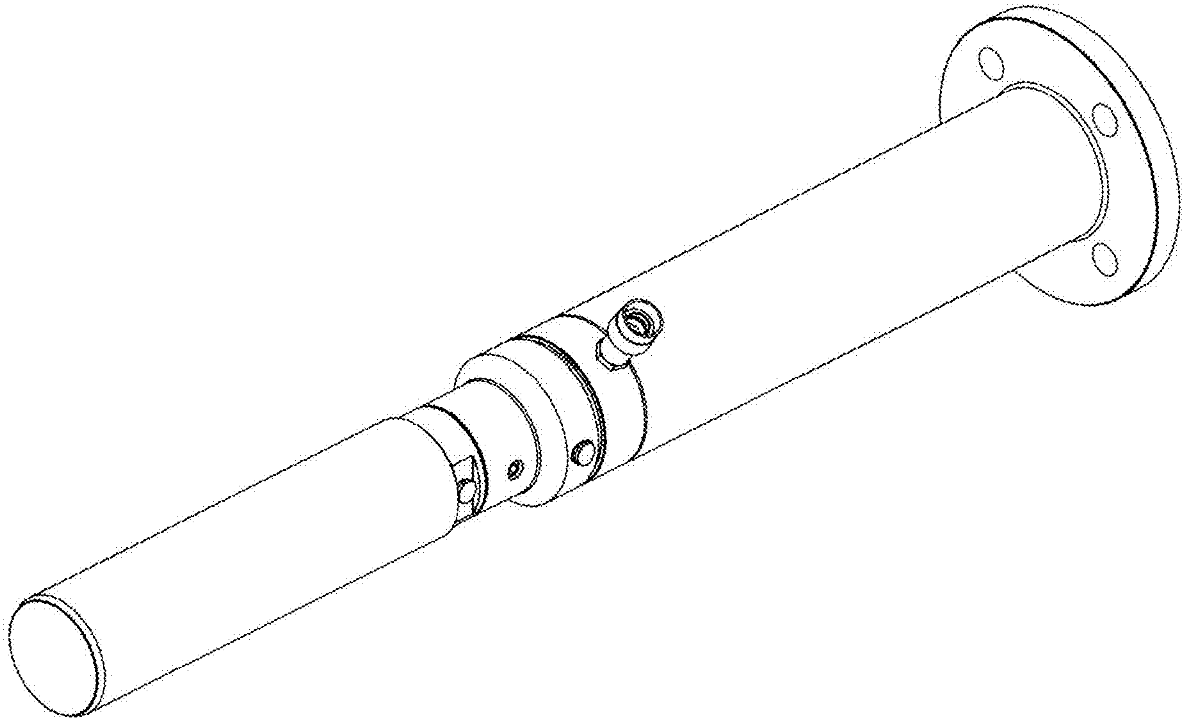
FIG. 51 is a top, perspective view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 52:
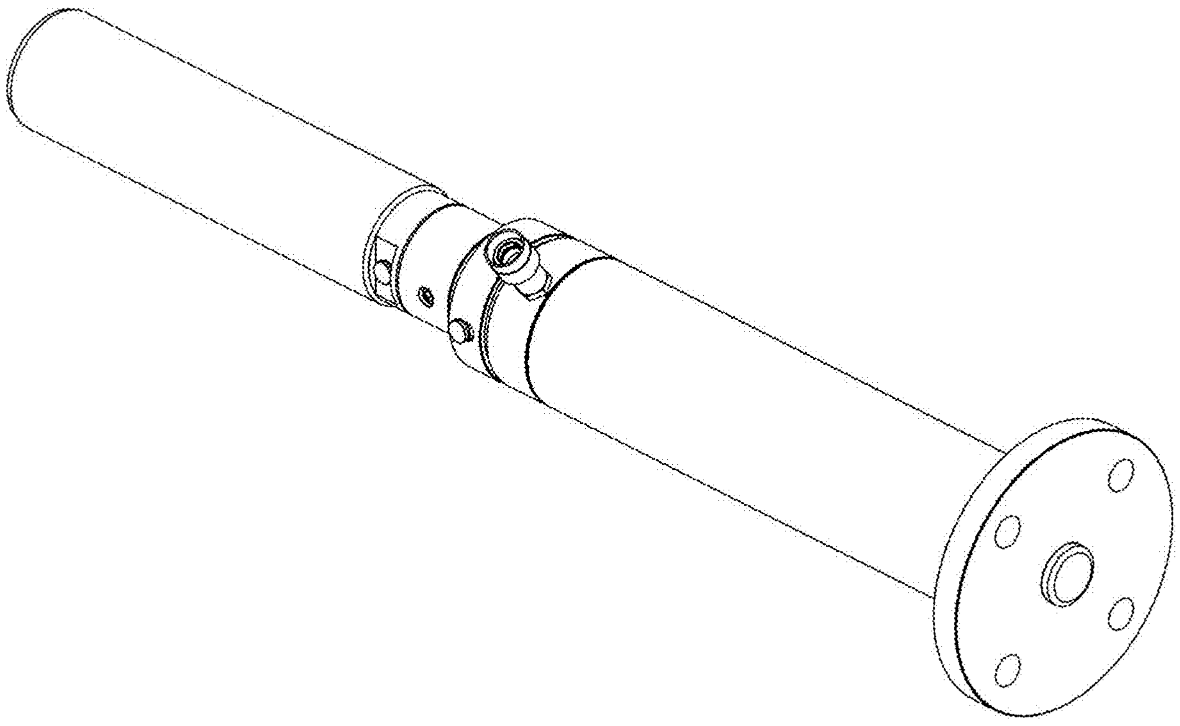
FIG. 52 is a top, perspective view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 53:
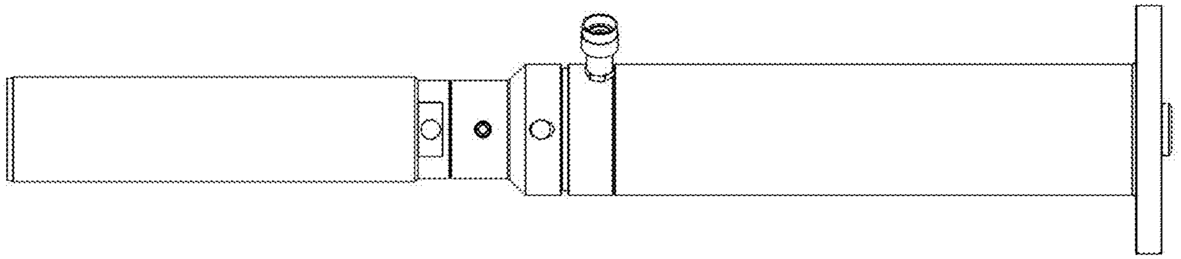
FIG. 53 is a side view of the hydraulic actuated rod column assembly with a piston; the view showing a hydraulically actuated arrangement; the view showing an extension rod, a subrod, and a plunger assembly; the view showing an extension rod; the view showing a subrod assembly, the view showing a plunger.
Figure 54:
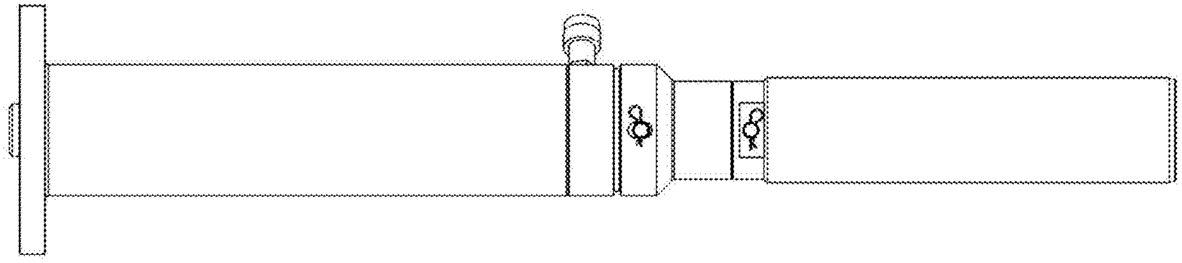
FIG. 54 is a side view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 55:
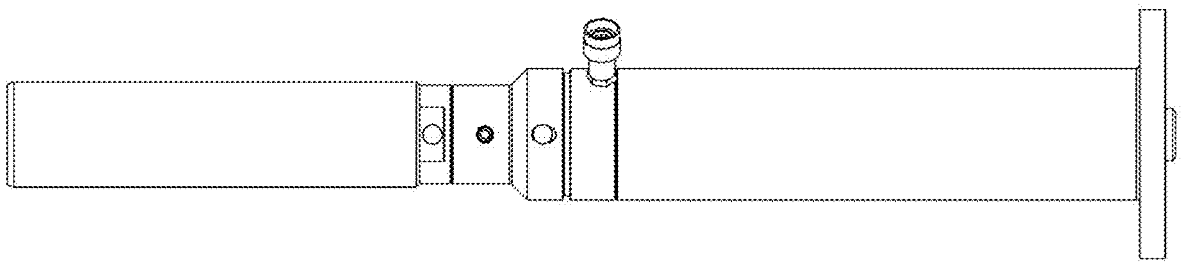
FIG. 55 is a top view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 56:
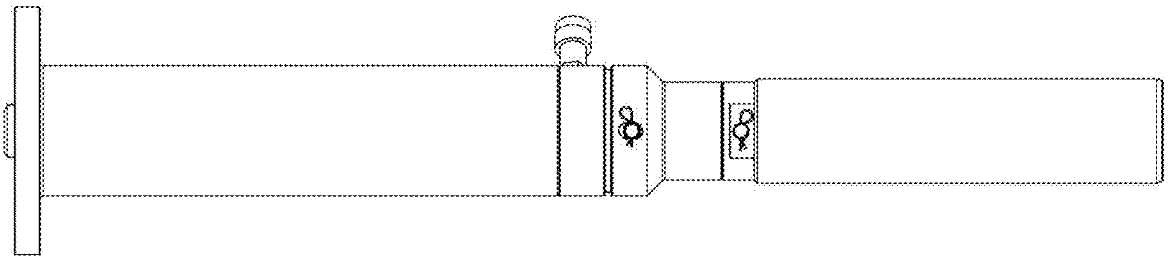
FIG. 56 is a bottom view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 57:
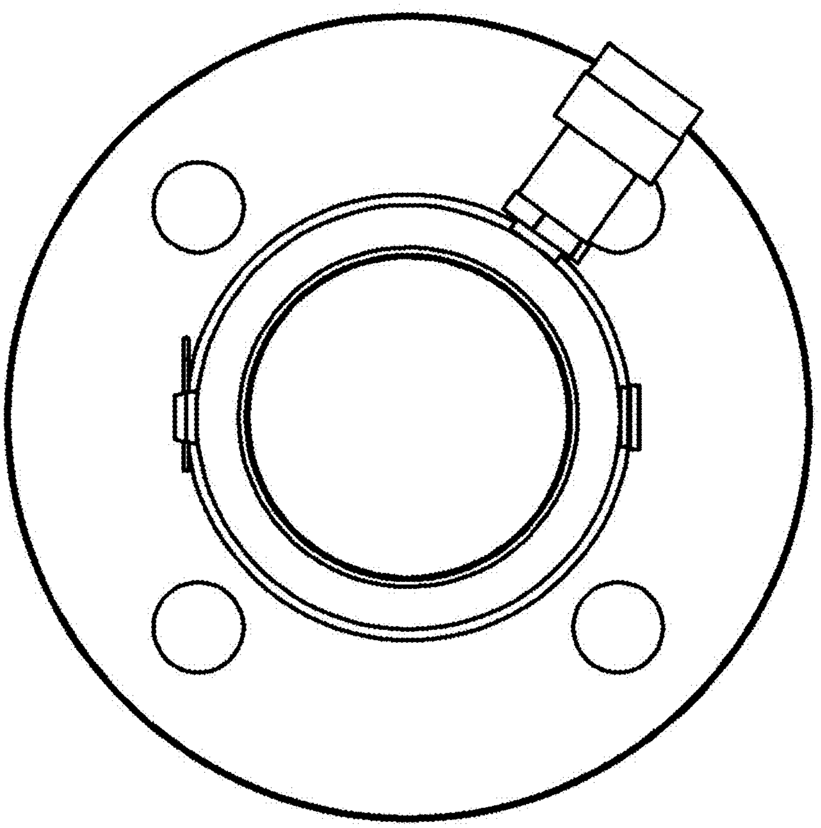
FIG. 57 is a front view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 58:
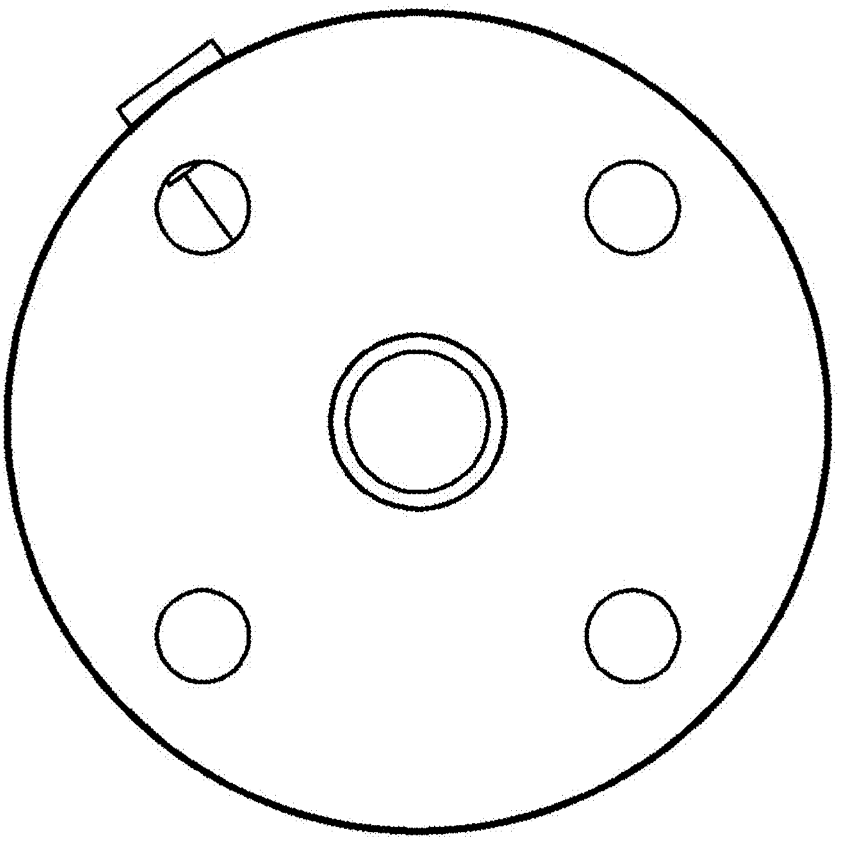
FIG. 58 is a rear view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 59:
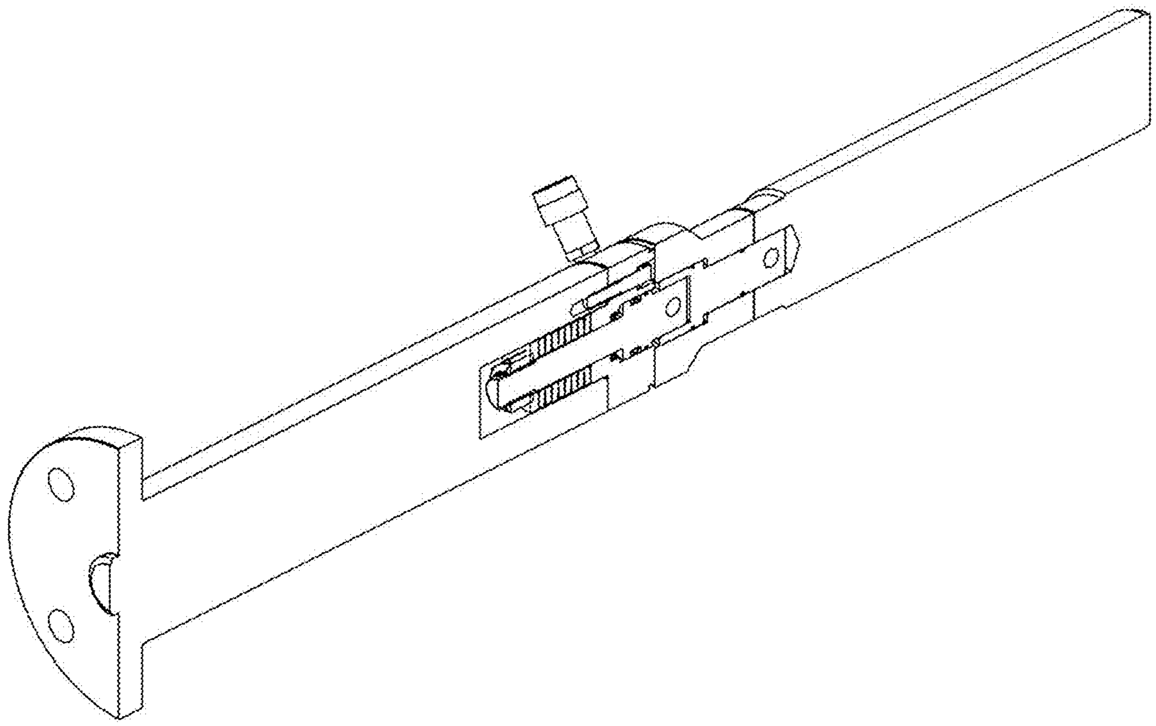
FIG. 59 is a top, perspective isometric cross-sectional view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 60:
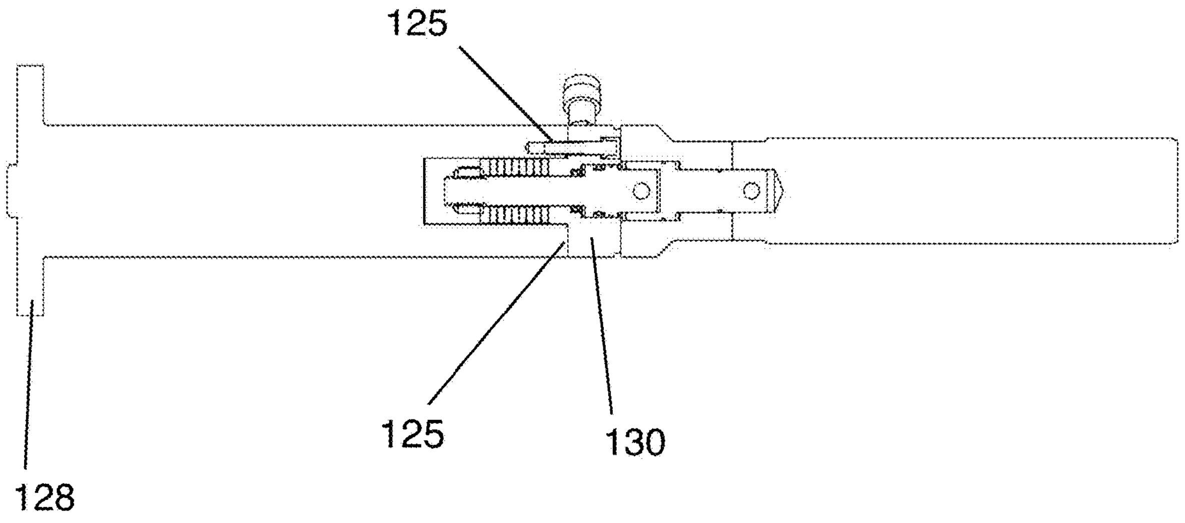
FIG. 60 is a cross-section view of the hydraulic actuated rod column assembly with a piston; the view showing a hydraulically actuated arrangement; the view showing an extension rod, a subrod, and a plunger rod assembly; the view showing an extension rod; the view showing a subrod assembly, the view showing a plunger.
Figure 61:
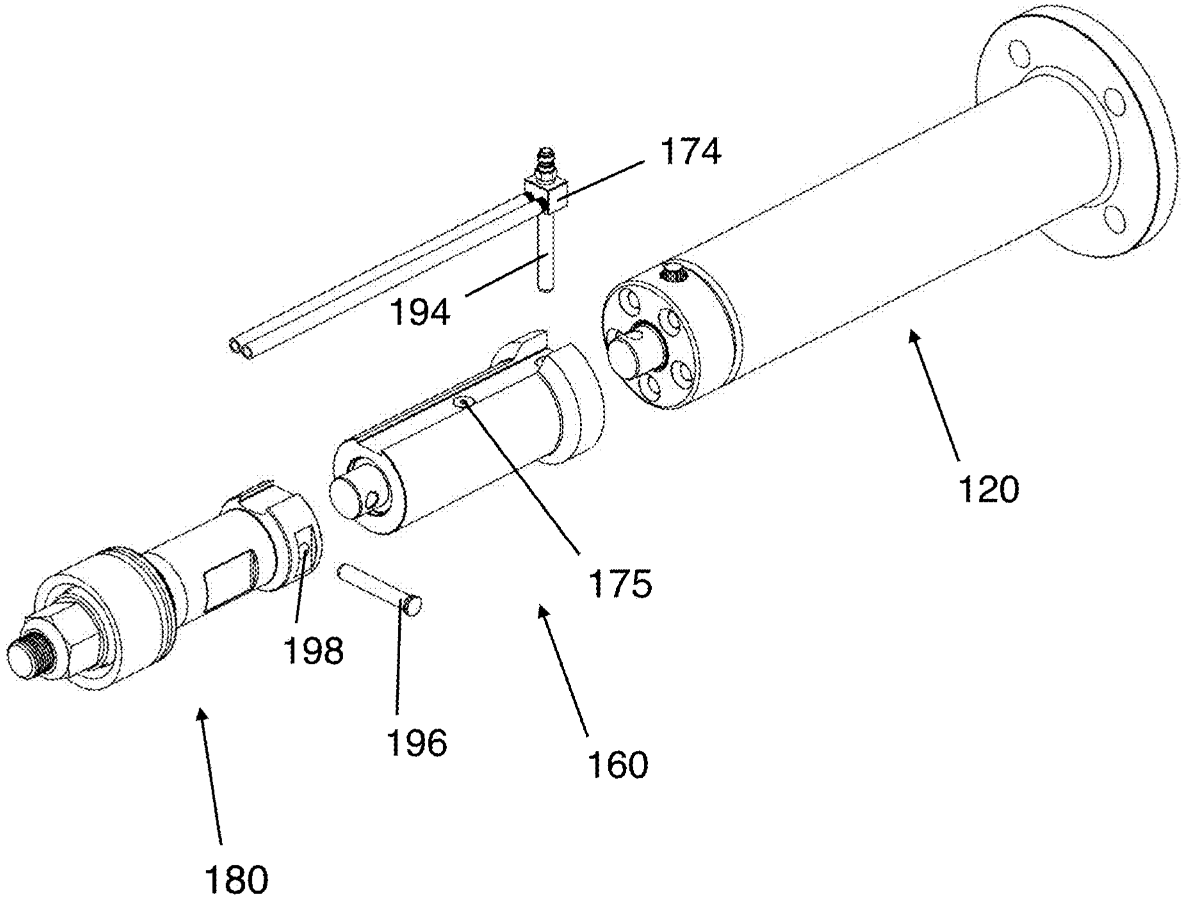
FIG. 61 is an exploded, top, perspective view of the wedge actuated extension rod with plunger assembly; the view showing an extension rod, a subrod, and a piston rod assembly.
Figure 62:
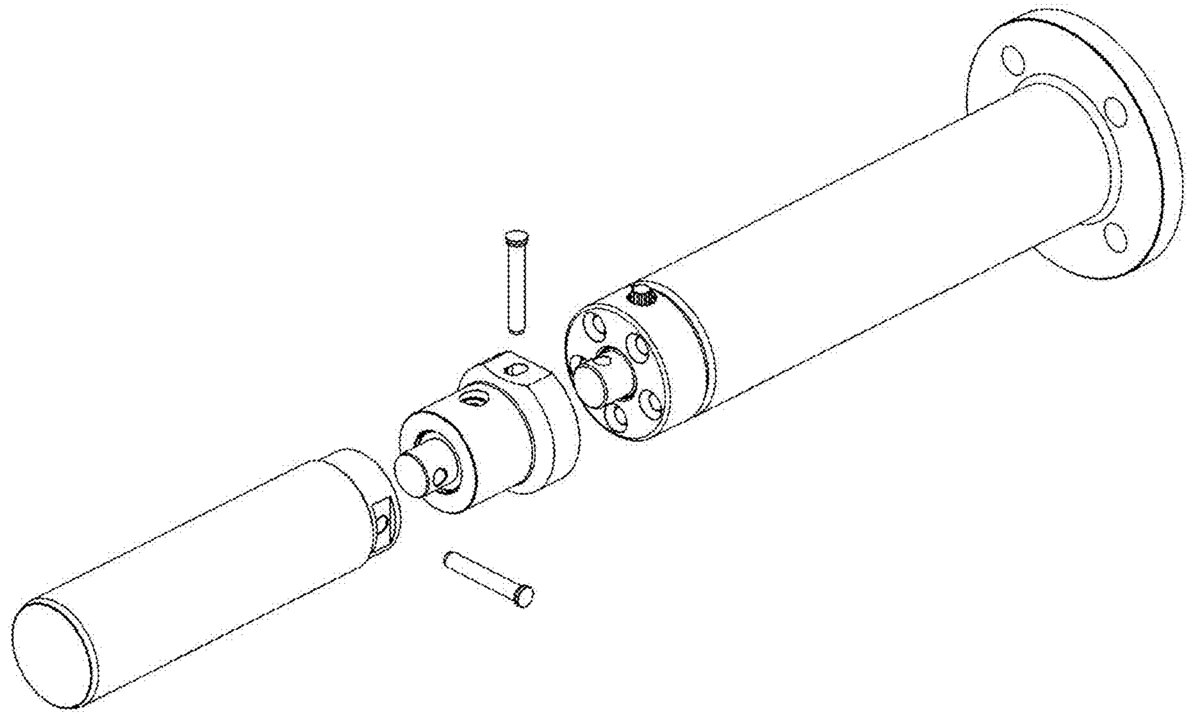
FIG. 62 is an exploded view of the modular reciprocating pump rod column system, a rod column assembly, and a plunger rod column assembly; the view showing a wedge bolt operation; the view showing an extension rod; the view showing a subrod assembly, the view showing a plunger.
Figure 63:
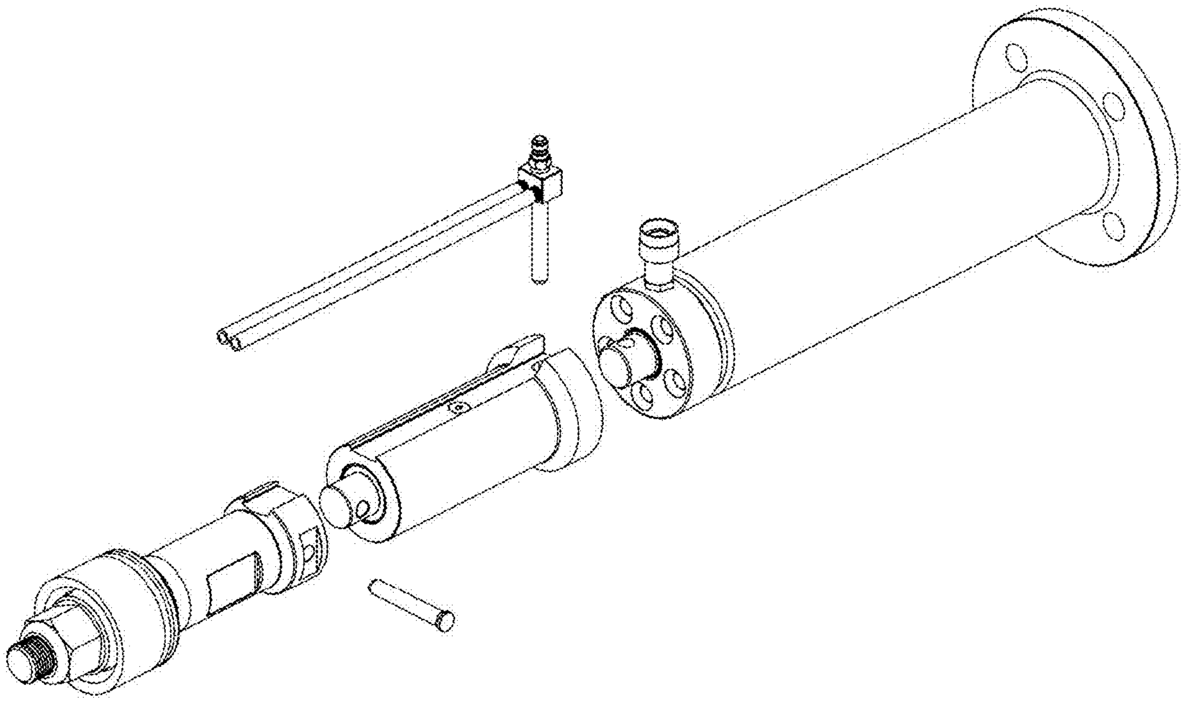
FIG. 63 is an exploded view of the hydraulic actuated extension rod with plunger assembly; the view showing an extension rod, a subrod, and a piston rod assembly.
Figure 64:
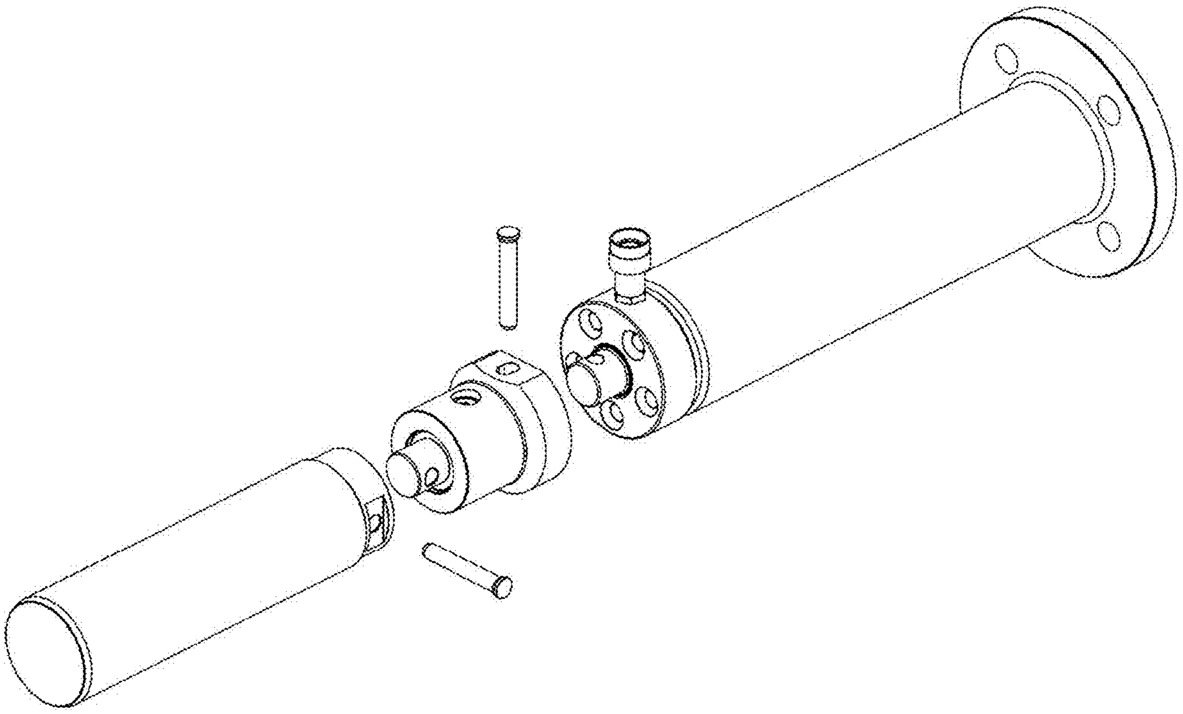
FIG. 64 is an exploded view of the modular reciprocating pump rod column system, a rod column assembly, and a plunger rod column assembly; the view showing a hydraulic operation; the view showing an extension rod; the view showing a subrod assembly, the view showing a plunger.
Figure 65:
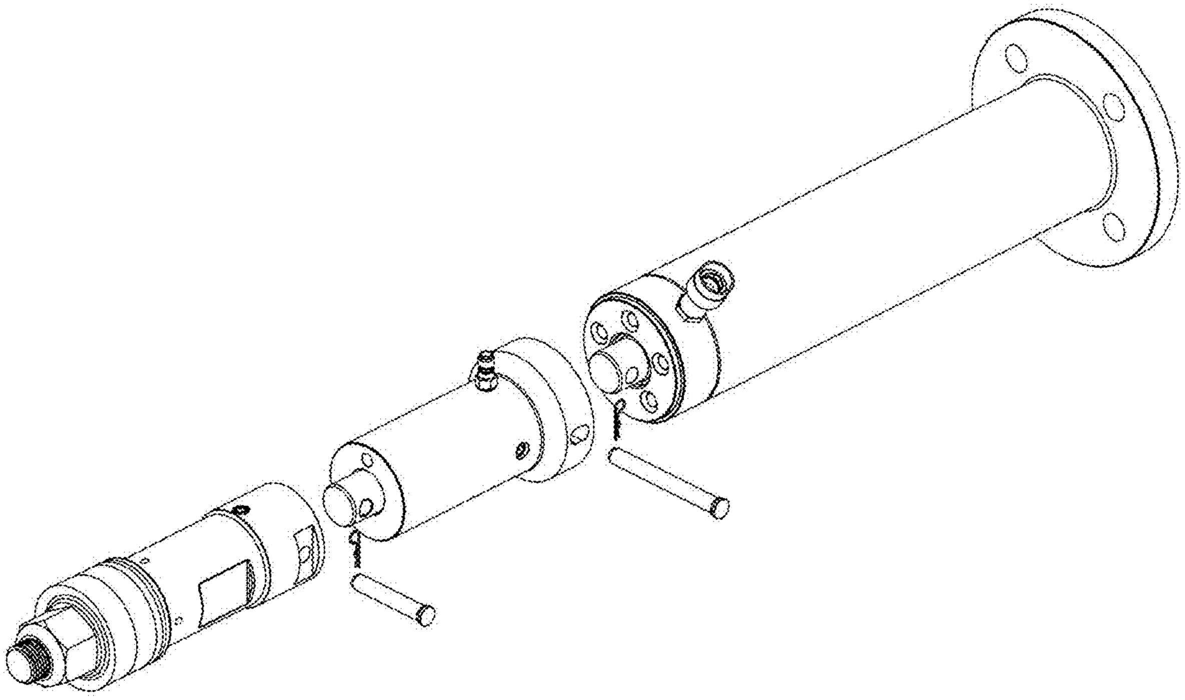
FIG. 65 is an exploded view of the modular reciprocating pump rod column system, a rod column assembly, and a plunger rod column assembly; the view showing a hydraulic operation; the view showing an extension rod; the view showing a subrod assembly, the view showing a piston rod assembly.
Figure 66:
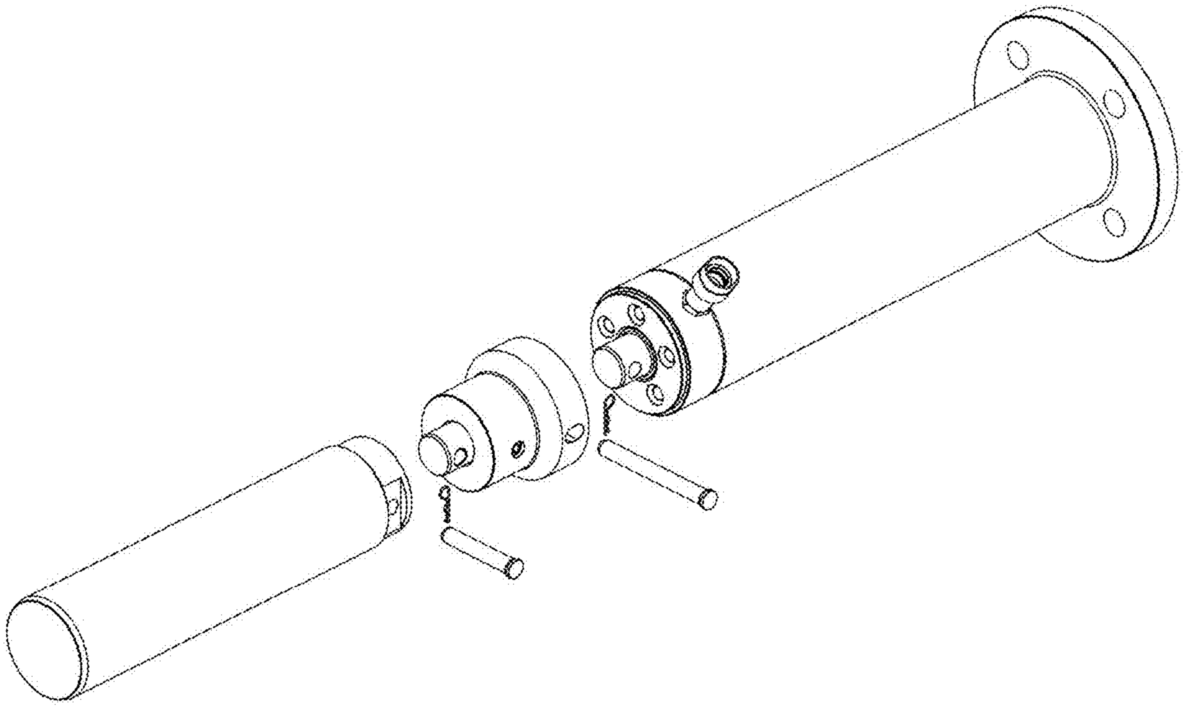
FIG. 66 is an exploded view of the modular reciprocating pump rod column system, a rod column assembly, and a plunger rod column assembly; the view showing a hydraulic operation; the view showing an extension rod; the view showing a subrod assembly, the view showing a plunger.
Figure 67:
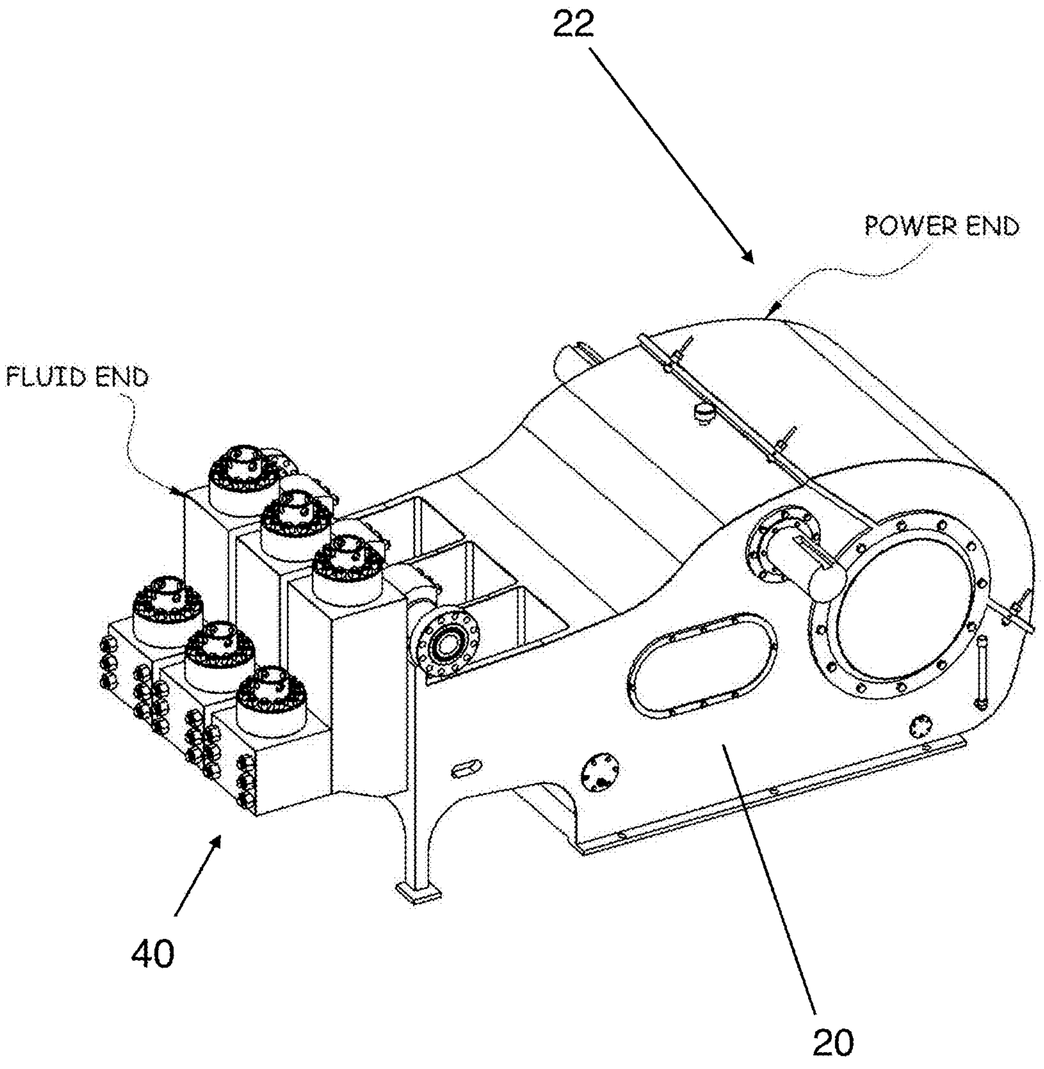
FIG. 67 is a top, perspective view of a reciprocating pump; the view showing the pump having a power end and a fluid end.
Figure 68:
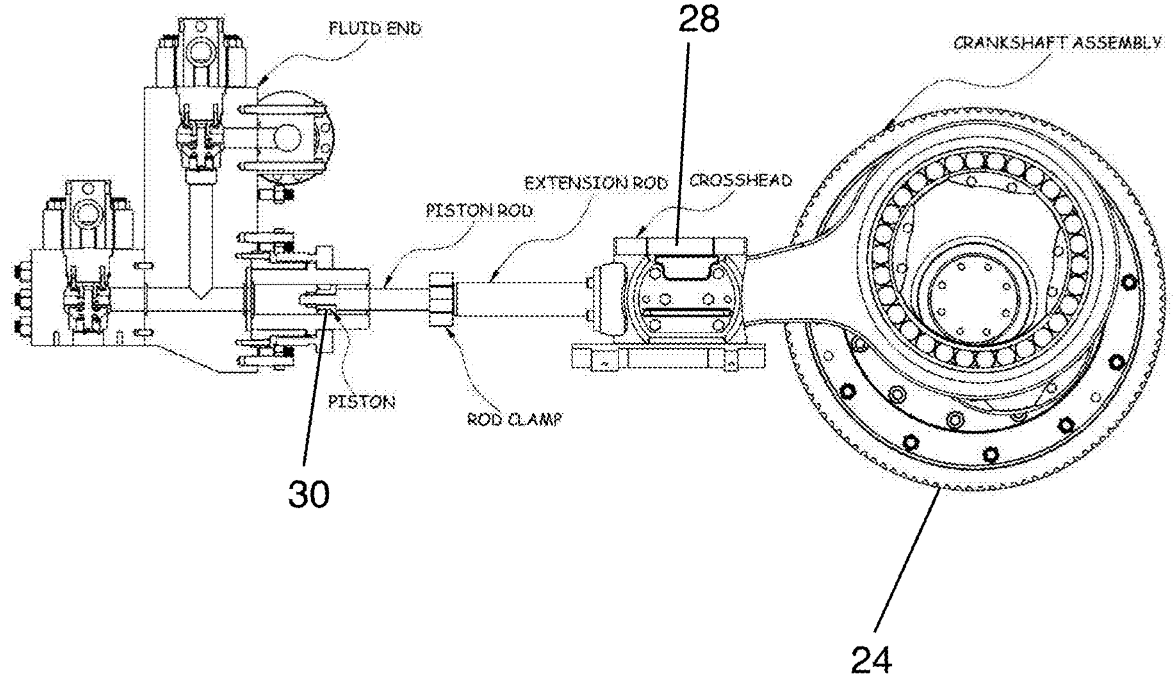
FIG. 68 is a combined isometric and perspective view of a reciprocating pump; the view showing the pump having a power end and a fluid end.
Figure 69:
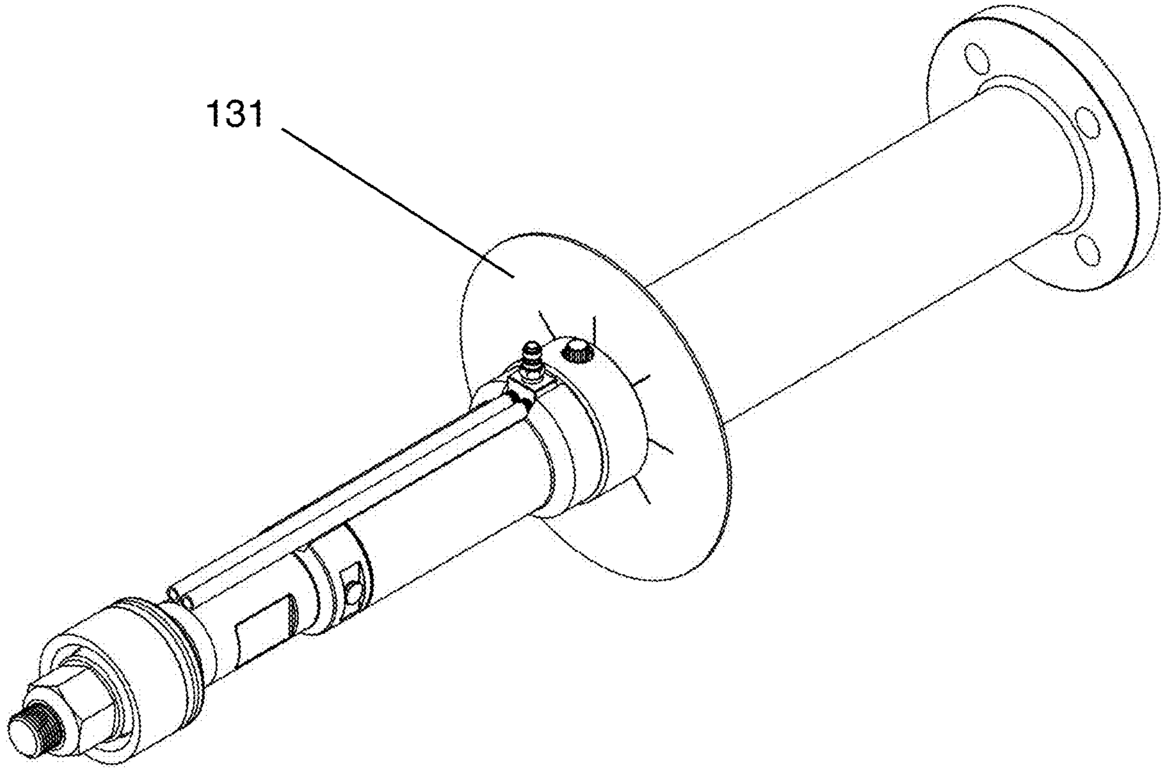
FIG. 69 is a top, perspective view of the modular reciprocating pump rod column system, a rod column assembly, and a piston rod assembly; the view showing a splash shield and embodiment of the present invention.
Figure 70:
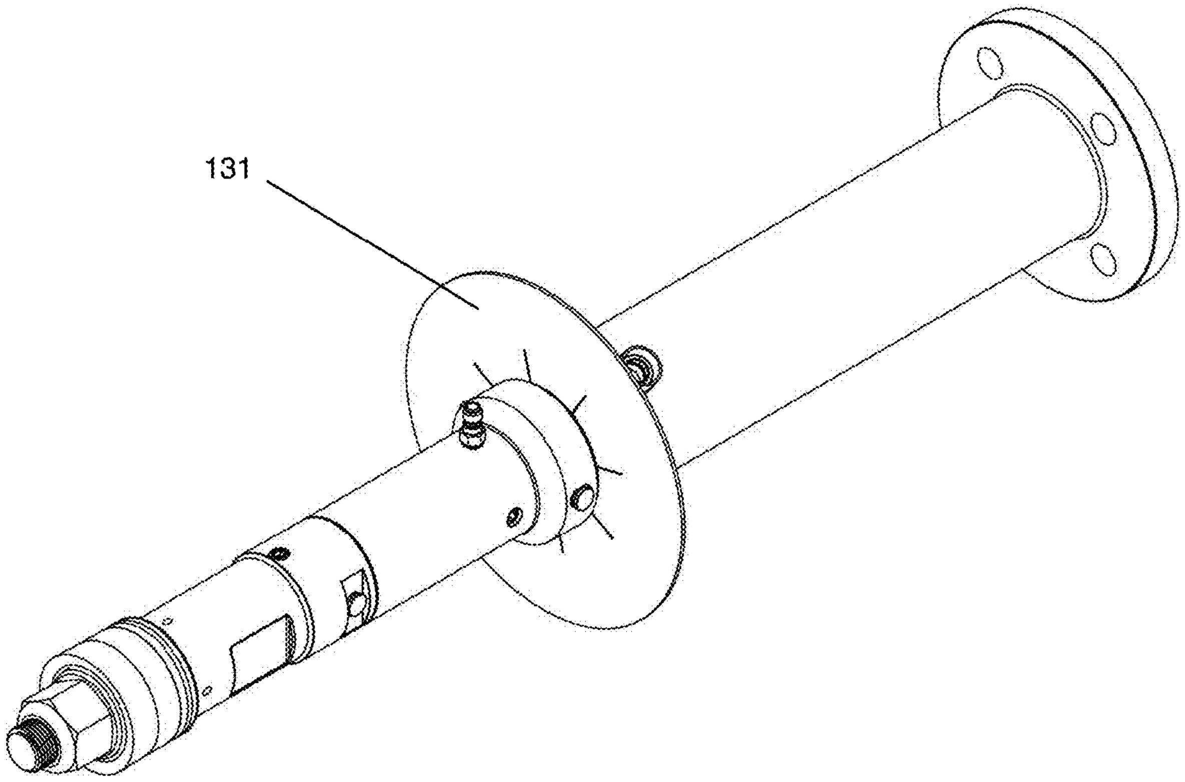
FIG. 70 is a top, perspective view of the modular reciprocating pump rod column system, a rod column assembly, and a plunger rod column assembly; the view showing a splash shield and embodiment of the present invention.
Figure 71:
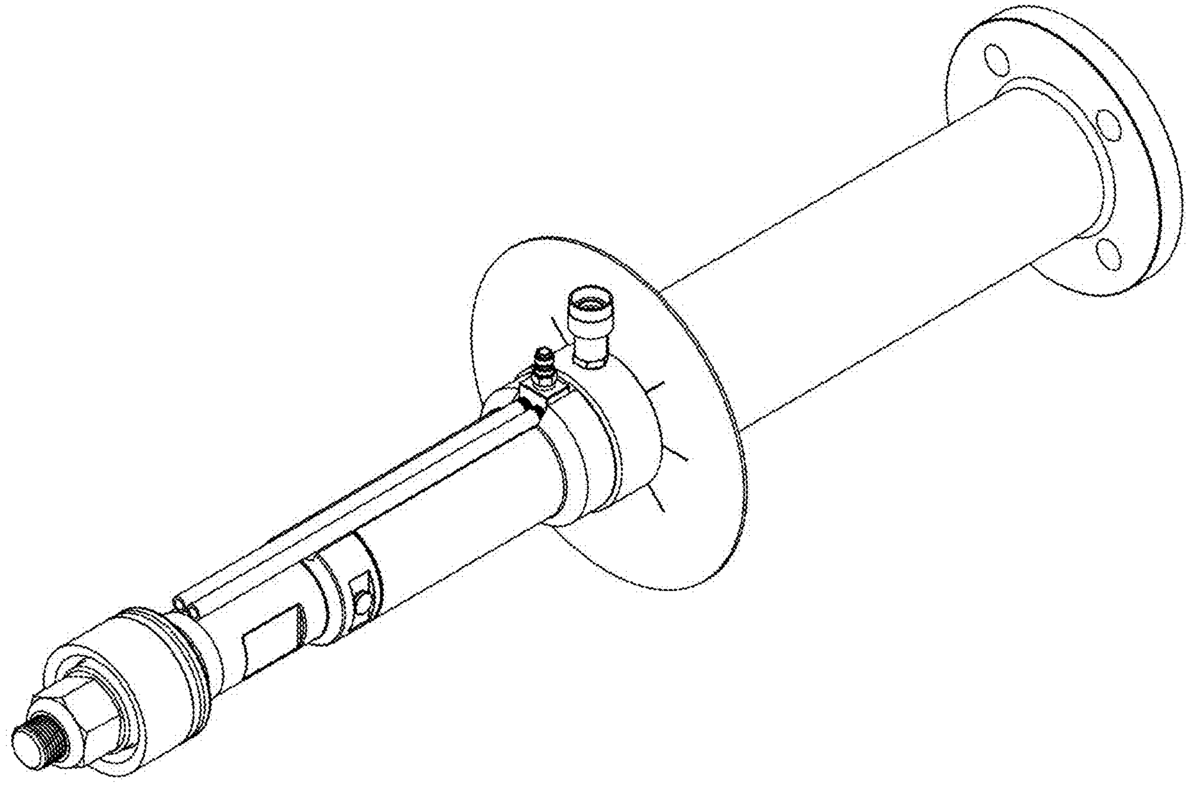
FIG. 71 is a top, perspective view of the modular reciprocating pump rod column system, a rod column assembly, and a plunger rod column assembly; the view showing a splash shield and embodiment of the present invention.
Figure 72:
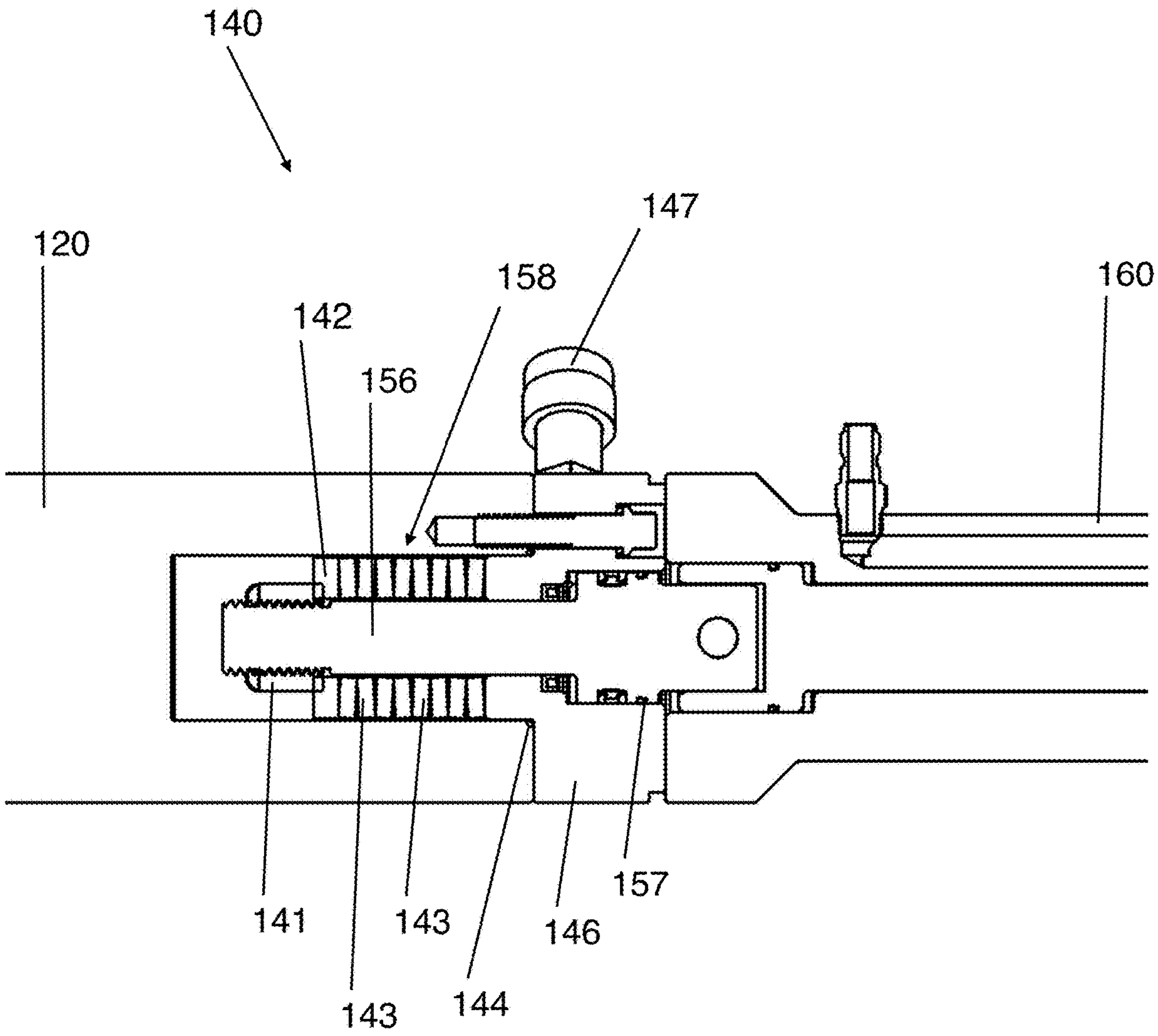
FIG. 72 is a cross-section view of the end cap assembly.
Figure 73:
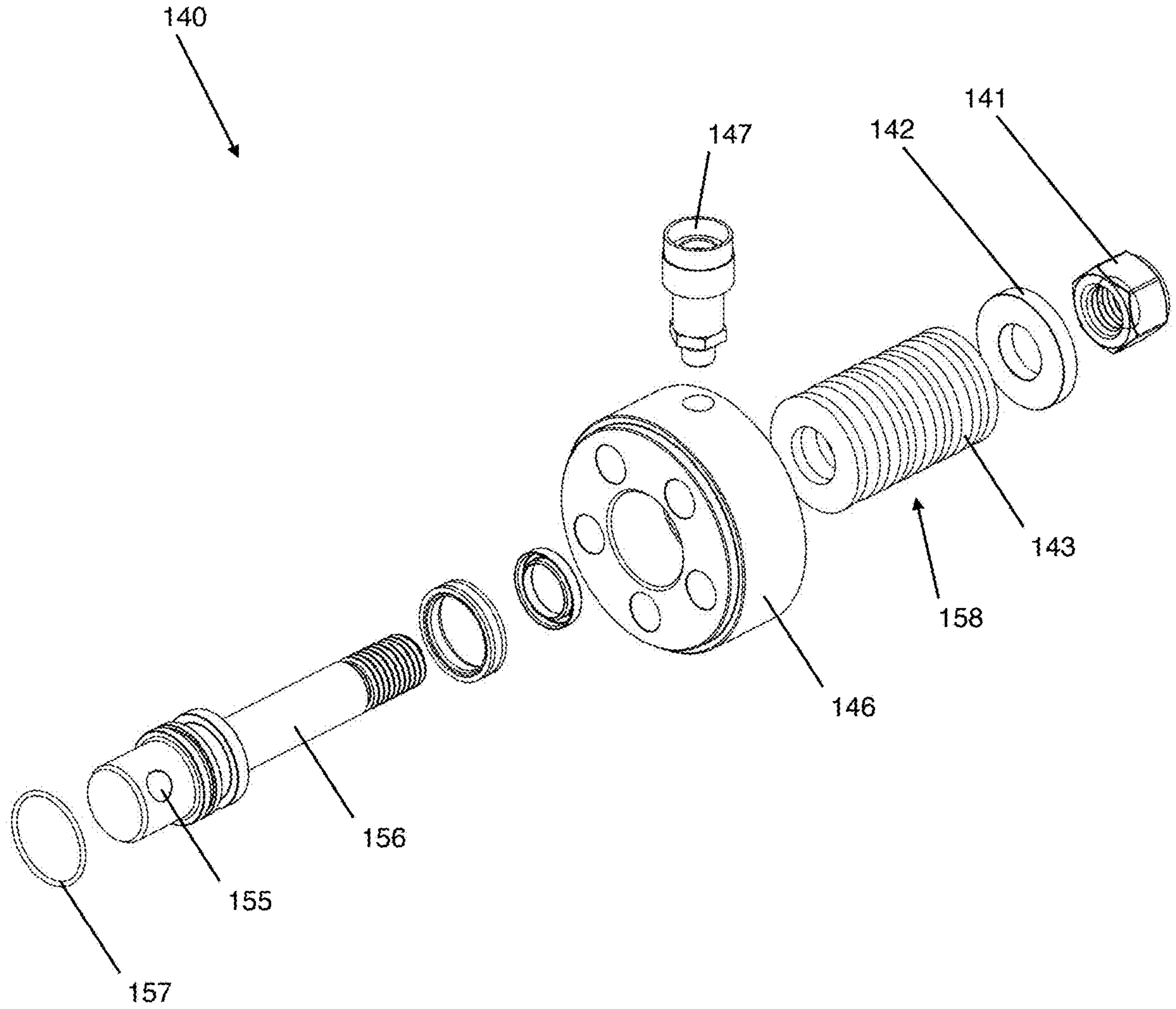
FIG. 73 is an exploded view of the end cap assembly.
Figure 74:
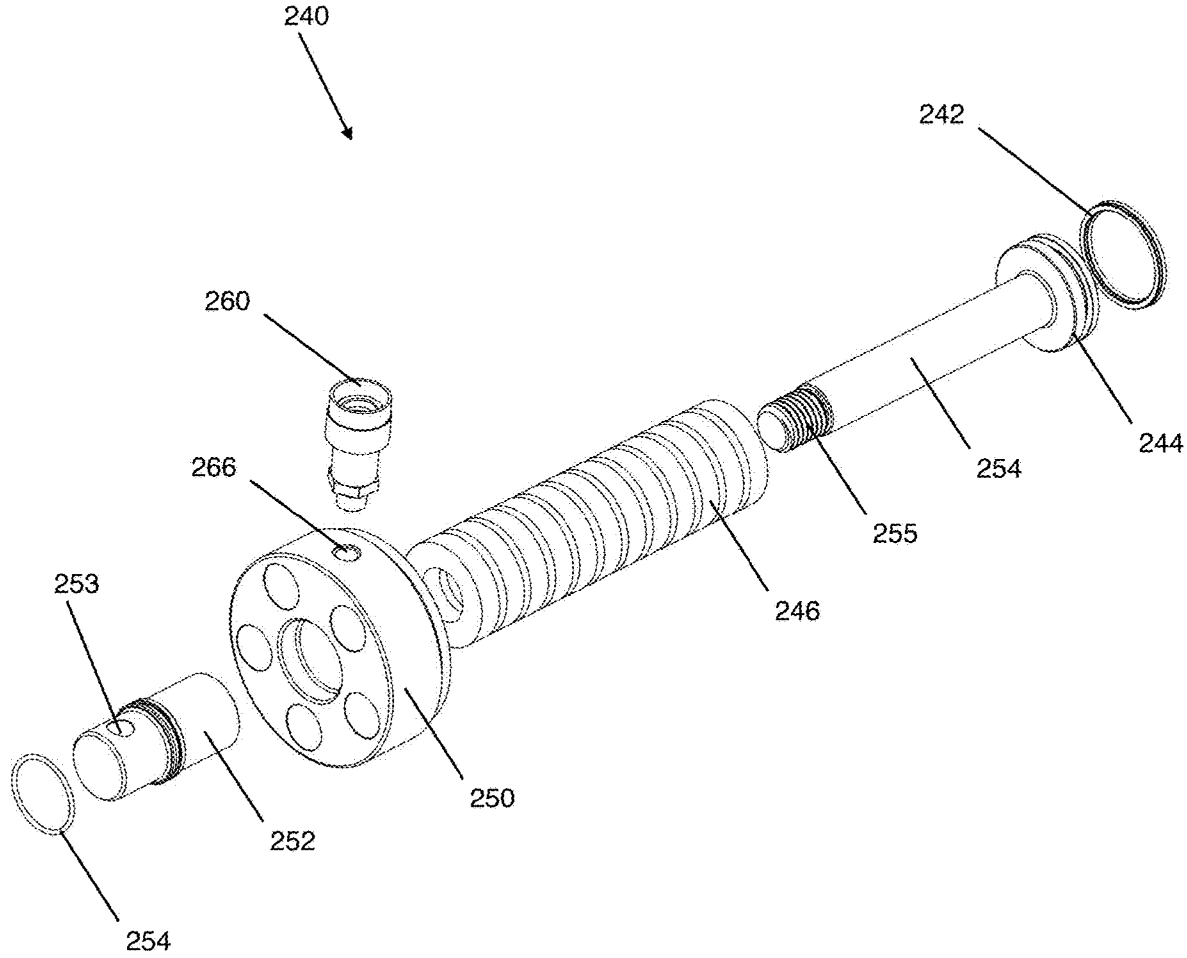
FIG. 74 is an exploded view of the end cap assembly.
Figure 75:
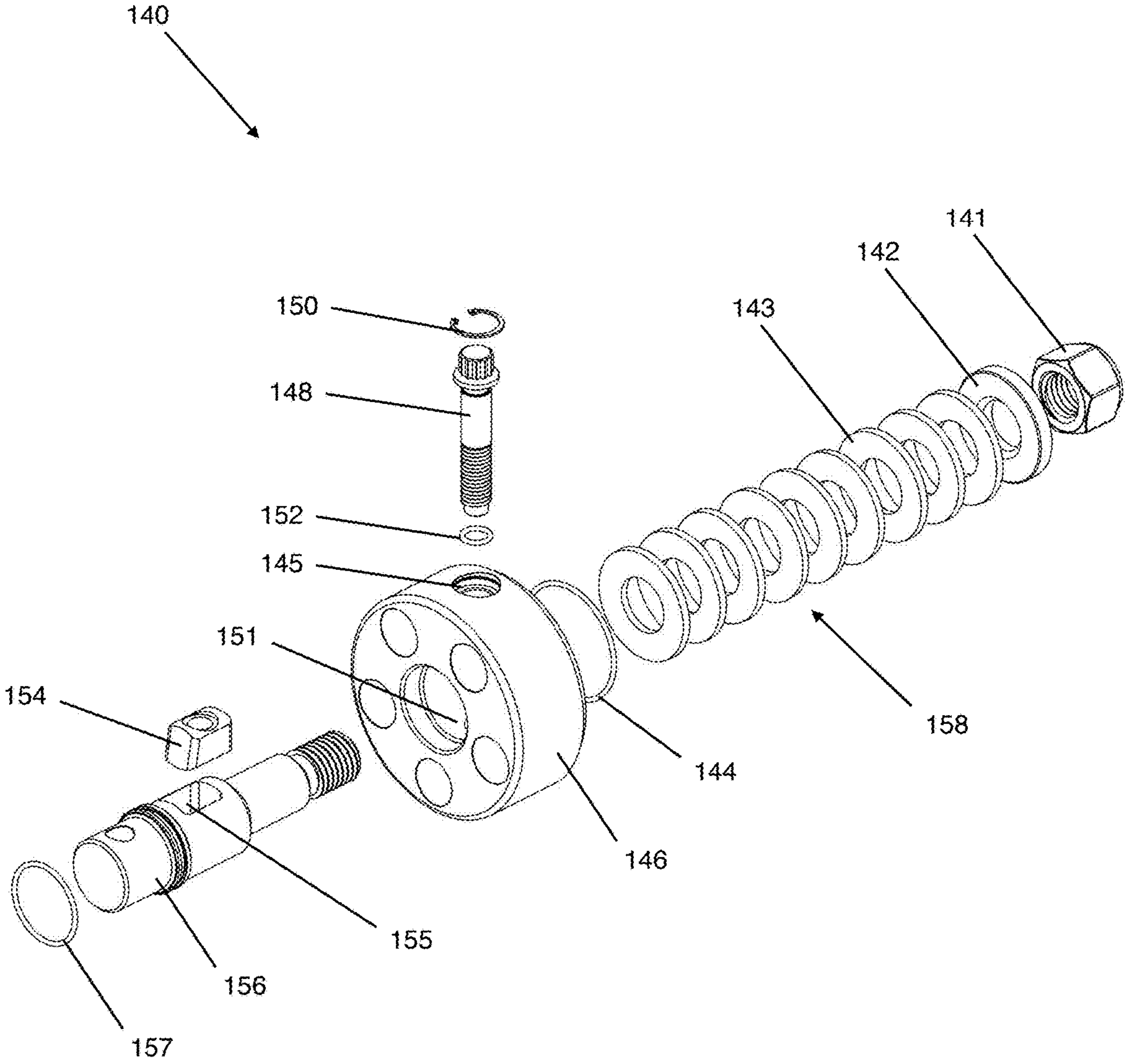
FIG. 75 is an exploded view of the end cap assembly.

The plunger shown in FIG. 49 has a counterbore in the rear face with a cross-pin hole that intersects the counterbore for installation of the front pin. This interface is designed to fit the forward end of the subrod which is also dimensionally the same as the extension rod front connection.

Hydraulic Embodiment:

In the arrangement shown, as one example, and specifically with reference to the figures, includes another method for controlling the spring compression. This second method and second system includes a hydraulic piston installed inside the primary extension rod. In this way, the system 100 is configured with a port located in the end cap. Hydraulic pressure is applied through this end cap, the hydraulic pressure is fed through a cross port drilled in the extension rod to the blind end of the internal position. Thus, when pressurized, the piston moves forward, compressing the springs against the end cap. In turn, this extends the center shaft, relieving tension on the front column pins and rear rod column pins. When the hydraulic pressure is released, this allows the springs to extend, retracting the center shaft.

Furthermore, and in this embodiment, as with the wedge release end cap, the hydraulically operated end cap can be removed as a unit from the extension rod.

Similarly, wear on the end surface of the extension rod of the hydraulically operated embodiment, to which the subrod is attached, provides for preventing the system from tensioning the piston and subrod. In this way, system 100 provides for replacing the end cap component if wear and/or damage occur. These benefits and more are disclosed herein and provide for cost and time advantages over the state of the art. These costs and time savings include but are not limited to, replacement of the end cap assembly that is less than replacing the entire rod column.

Furthermore, the present system provides for alternate materials in the end cap assembly which provide for heat treatments, surface treatments and the like which are contemplated herein. In this way, the characteristics of system 100 include modifying the material or treatment of materials which reduce damage and/or wear on the end of the rod.

The second method for controlling the spring compression is based on a hydraulic piston installed inside the primary extension rod. As hydraulic pressure is applied through a port (or "hydraulic port" or "hydraulic port of the end cap") 147, located in the end cap, it is fed through a cross port 149 drilled in the extension rod to the blind end of the internal piston. When pressurized the piston moves forward, compressing the springs (or "disc springs") against the end cap which in turn extends the center shaft, relieving tension on the forward and rear rod column pins (or "front pin" and "rear pin").

Releasing the hydraulic pressure allows the springs to extend, retracting the center shaft.

As with the wedge release end cap, the hydraulic operated end cap can be removed as a unit from the extension rod.

Wear on the end surface of the extension rod to which the subrod is attached can prevent the system from tensioning the piston and subrod. The new invention allows this component to be replaced if wear or damage occur. This benefits the end user in that the time and cost associated with replacing the end cap assembly is less that replacing the entire extension rod which can weigh 150 pounds or more.

The removable end cap also allows for use of alternate materials, heat treatment, and or surface treatments for the end cap that are different from those of the main body of the extension rod. The characteristics can be modified to reduce the potential for damage and wear on the end of the rod, this is not possible with the existing one-piece extension rod designs.

Other:

Plurality of Pins: In the arrangement shown, as one example, rod column assembly 100 includes three primary components secured together and/or attached via two pins (a rear pin and a forward pin). The extension rod 120 of the rod column assembly 100 is secured to the power end of the crosshead. In this way, the piston rod is configured to mount and locate the piston.

In the arrangement shown, as one example, two pins are shown. However, other numbers of pins are hereby contemplated for use, and at various locations. For example, larger constructions may have two pins at the extension rod location and a single pin at the forward pin location. Similarly, four pins are hereby contemplated for use, five pins are hereby contemplated for use, six pins, or more.

Actuator: Furthermore, in the arrangement shown, rod column assembly 100 includes a subrod 160. Subrod 160 is formed of any suitable size, shape, and design and is configured to connect the extension rod to the piston rod and includes an actuator. The actuator being configured to pull the extension rod and the piston rod toward the subrod 160. In this way, the subrod 160, extension rod, piston rod, and actuator form a rigid column when placed and actuated.

Alternative Embodiment:

With reference to the figures, a rod column system, a rod column for a reciprocating mud pump, a rod column assembly, method of assembly and disassembly, and method of use 100 are presented. Rod column system, a rod column for a reciprocating mud pump, a rod column assembly, method of assembly and disassembly, and method of use 100 (hereafter referred to as "rod column", "rod column", "rod column assembly", or simply "system") is formed of any suitable size, shape and design.

In the arrangement shown, as one example, system 100 includes, in the embodiment(s) depicted, a mud pump 20, the mud pump 20 having a power end 22, the mud pump 20 having a crankshaft assembly 24, the mud pump 20 having a crosshead 28, a piston 30, the mud pup 20 having a fluid end 40, and a rod column assembly 100. The rod column assembly 100 having an extension rod 120, the rod column assembly 100 having an end cap assembly 140, and the rod column assembly 100 having a piston rod assembly 180, among other components, features, and functions.

In the arrangement shown, as one example, rod column assembly 100 is configured to be cost-effective and efficient to operate, greatly improving on the state of the art. The rod column assembly 100 is configured as a simplified and sophisticated design with minimal components, minimal components being impossible to achieve in the state of the art. In this way, the rod column assembly 100 provided herein reduces cost for assembly, reduces cost for maintenance, requires no specialized tooling for operation, and requires no specialized tooling for maintenance. Furthermore, and in the arrangement shown, rod column assembly 100 provides an ease of replacing commonly worn components through a unique design which changes the state of the art of piston rods in mud pumps.

Plurality of Pins: In the arrangement shown, as one example, rod column assembly 100 includes three primary components secured together and/or attached via two pins (a rear pin 110 and a forward pin 111). The extension rod 120 of the rod column assembly 100 is secured to the power end of the crosshead. In this way, the piston rod is configured to mount and locate the piston 30.

In the arrangement shown, as one example, two pins are shown. However, other numbers of pins are hereby contemplated for use, and at various locations. For example, larger constructions may have two pins at the extension rod location and a single pin at the forward pin location. Similarly, four pins are hereby contemplated for use, five pins are hereby contemplated for use, six pins, or more.

Actuator: Furthermore, in the arrangement shown, rod column assembly 100 includes a subrod 160. subrod 160 is formed of any suitable size, shape, and design and is configured to connect the extension rod to the piston rod and includes an actuator 152. The actuator being configured to pull the extension rod and the piston rod toward the subrod 160. In this way, the subrod 160, extension rod, piston rod, and actuator form a rigid column when placed and actuated.

Replaceable End: Furthermore, and in the arrangement shown, as one example, the rod column assembly 100 includes an extension rod which is formed of a multi-piece construction. In this way, the extension rod includes a replaceable end. The replaceable end 130 extending a length from a first end or extension rod end to a second end having an interior alignment spigot 131, an exterior alignment spigot 132, and a plurality of fasteners 133.

In the arrangement shown, as one example, the replaceable end is removable as the extension rod is formed of multiple pieces when including the replaceable end. For example, wear may occur on the replaceable end. In this event, the end, which is lightweight and can be easily removed from the extension rod, makes for replacing and/or removing the part for repair easily completed. This reduces costs compared to the state of the art. In the existing state of the art, those using mud pumps replace the entire extension rod, which can weigh over 150 pounds. Extension rods need to be sturdy, so breaking into multiple pieces is contrary to the thinking in the state of the art. However, rod assembly 100 provides multiple pieces which are rigid but can be more easily replaced as the replaceable end may weigh only 10 pounds or potentially less while also being easy to replace without special tools.

Furthermore, in the arrangement shown, the replaceable end provides that a user can make the replaceable end out of different materials from the rest of the extension rod. This can further reduce costs as heat treatments and surface treatments need only be applied to the replaceable rod rather than the entire extension rod. This also further reduces wear and requires less often replacements of the system and/or results in less damage to the rod.

Alignment Spigot: In the arrangement shown, as one example, the replaceable end includes an alignment spigot. The alignment spigot includes a counterbore. The counterbore, in the arrangement shown, ensures the end cap is held concentric with the extension rod body, enabling multi-piece extension rods for the first time in the state of the art.

Plurality of Fasteners: In the arrangement shown, as one example, the replacement end and extension rod include a plurality of fasteners. The plurality of fasteners are formed of any suitable size, shape, and design and are configured to secure the replaceable end to the extension rod. The plurality of fasteners, or fasteners, extend through the end cap and/or replaceable end and thread into tapped receiving holes machined into the face of the extension rod. The opposite face of the replaceable end has a male alignment spigot with a cross bore which interfaces with the subrod, as is shown herein.

In the arrangement shown, as one example, the system 100 includes a multi-piece extension rod. However, the extension rod may also be a single piece and/or of singular construction.

Packing Set: A novel feature of this design is that the plunger can be attached to the subrod or the extension rod. Installing the plunger can be difficult as it must be forced into the packing set which is a series elastomeric seals which contact the outside surface of the plunger with high force. Using the extension rod to push the plunger into the packing during assembly or pulling the plunger from the packing while disassembling is a benefit of the design.

Plurality of O-Rings: In the arrangement shown, as one example, the subrod also includes a plurality of O-rings. The plurality of o-rings are configured and installed on the outside and/inside diameters of components. In this way, the o-rings prevent contamination of components from drilling fluids, debris, and the like, when the mud pump is in operation.

In addition to the above identified features, options, controls, and components, system 100 may also include other features and functionalities, among other options, controls, and components.

It will be appreciated by those skilled in the art that other various modifications could be made to the system, process, and method of use without parting from the spirit and scope of this disclosure. All such modifications and changes fall within the scope of the claims and are intended to be covered thereby.

What is claimed is:

1. A modular rod column assembly, comprising:
an extension rod assembly;
the extension rod assembly extending a length from a first end to a second end;
the extension rod assembly having an exterior surface;
the extension rod assembly having a plurality of attachment features of the first end;
the extension rod assembly having a plurality of attachment features of the second end;
the extension rod assembly having a flange;
an end cap assembly;
the end cap assembly having a lock nut;
the end cap assembly having an end cap;
the end cap assembly having a center shaft;
the end cap assembly having a plurality of disc springs;
a subrod assembly;
the subrod assembly extending a length from a first end to a second end;
a piston rod assembly;
the piston rod assembly extending a length from a first end to a second end;
the piston rod assembly having a lock nut;
wherein the plurality of disc springs can be engaged and disengaged for replacement of parts and ease of maintenance; wherein engaging the plurality of disc springs creates an axial force on the center shaft of the end cap assembly; wherein disengaging the plurality of disc springs releases the axial force on the center shaft of the assembly; wherein the axial force required for engaging is singular in direction; wherein the axial force required for disengaging is singular in direction;
the subrod assembly having a solid center shaft; wherein the solid center shaft is one piece;
wherein the center shaft of the subrod assembly is configured to connect the piston rod assembly to the extension rod;
the subrod assembly having a hydraulic tube recess;
the subrod assembly having a hydraulic tube port;
the subrod assembly having a retainer screw.

2. The assembly of claim 1, further comprising:
wherein the piston rod is a plunger.

3. The assembly of claim 1, further comprising:
wherein the piston rod is a plunger;
wherein the plunger is configured to compress a packing.

4. The assembly of claim 1, further comprising:
an integrated wedge assembly, comprising:
the end cap assembly having a wedge;
the end cap assembly having a wedge inset;
a wedge bolt;
a wedge bolt insert;
wherein the integrated wedge assembly is configured to compress the plurality of disc springs when tightened;
wherein the integrated wedge assembly is configured to decompress the plurality of disc springs when loosened.

5. The assembly of claim 1, further comprising:
the end cap assembly having a hydraulic piston;
wherein the hydraulic piston is configured to compress the plurality of disc springs.

6. The assembly of claim 1, further comprising:
the subrod assembly having an outer housing.

7. The assembly of claim 1, further comprising:
the extension rod assembly having a hydraulic system;
wherein the hydraulic system of the extension rod assembly is configured to provide an axial force on the center shaft.

8. The assembly of claim 7, further comprising:
wherein the piston rod is a plunger.

9. The assembly of claim 1, further comprising:
a front pin;
wherein the front pin is configured to fasten the piston rod assembly to the subrod assembly.

10. The assembly of claim 9, further comprising:
wherein the piston rod is a plunger.

11. The assembly of claim 1, further comprising:
a rear pin; and
a front pin.

12. The assembly of claim 11, further comprising:
wherein the piston rod is a plunger.

13. A hydraulically actuated extension rod, comprising:
a hydraulic system;
an extension rod assembly;
the extension rod assembly extending a length from a first end to a second end;
the extension rod assembly having an exterior surface;
the extension rod assembly having a plurality of attachment features of the first end;
the extension rod assembly having a plurality of attachment features of the second end;
the extension rod assembly having a flange;
an end cap assembly;
the end cap assembly having a lock nut;
the end cap assembly having an end cap;
the end cap assembly having a hydraulic port;
the end cap assembly having a hydraulic cross port;
the end cap assembly having a center shaft;
the center shaft operably connected to a piston;
the end cap assembly having a plurality of disc springs;
a subrod assembly;
the subrod assembly extending a length from a first end to a second end;
the subrod assembly having an inner shaft;
a piston rod assembly;
the piston rod assembly extending a length from a first end to a second end;
the piston rod assembly having a lock nut;
wherein the plurality of disc springs can be engaged and disengaged for replacement of parts and ease of maintenance; wherein engaging the plurality of disc springs creates an axial force on the center shaft of the end cap assembly; wherein disengaging the plurality of disc springs releases the axial force on the center shaft of the assembly;
wherein the hydraulic system is configured to compress the plurality of disc springs when hydraulic fluid is increased in pressure; wherein increasing the hydraulic fluid pressure is caused by injecting hydraulic fluid into a hydraulic port of the end cap assembly, the same hydraulic fluid pressure moving through the hydraulic cross port and into a cavity in the extension rod; wherein the hydraulic fluid pressure engages the piston operably connected to the center shaft; wherein the piston compresses the plurality of disc springs; wherein when the plurality of disc springs are compressed, the end cap assembly is caused to move away from the extension rod, thereby releasing the inner shaft of the subrod assembly.

14. The assembly of claim 13, further comprising:
wherein the piston rod assembly is a plunger.

15. The assembly of claim 13, further comprising:
wherein the end cap assembly is configured to generate a singular, unidirectional axial force that simultaneously pulls the piston rod assembly, the subrod assembly, and the extension rod assembly together;
wherein the unidirectional axial force pulls the piston rod assembly against a forward face of the subrod assembly, and pulls a rear face of the subrod assembly against the extension rod assembly.

16. The assembly of claim 13, further comprising:
wherein when fluid pressure is decreased in the hydraulic system, the pressure in the cavity is decreased and the piston releases pressure on the plurality of disc springs such that the disc springs are decompressed, thereby pulling the inner shaft of the subrod assembly.

17. A method of assembling a reciprocating pump rod column for replacement of fluid end expendables, comprising the steps:
rotating the reciprocating pump rod column so that an extension rod assembly is at its rear most position;
actuating an extension rod assembly end cap assembly, wherein actuating the extension rod assembly end cap assembly is causing compression of internal springs, in turn causing a center shaft to extend outward from a face of the end cap assembly;
installing a piston rod onto the extension rod; wherein installing the piston rod assembly onto the extension rod assembly is piloting the center shaft of the extension rod assembly into a counterbore on a back of the piston rod;
aligning a set of cross-pin holes of the piston rod with a second set of cross-pin holes of the center shaft of the extension rod; wherein aligning the set of cross-pin holes of the piston rod with the second set of cross-pin holes of the center shaft of the extension rod assembly is completed by utilizing a keyway;
installing a first pin; wherein the first pin fastens the piston rod assembly to the extension rod; wherein installing the first pin is placing the first pin into a first pin bore;
actuating the end cap assembly; wherein actuating the end cap assembly removes compression of an internal spring pack; wherein removing compression of the internal spring pack extends an overall space of the spring pack; wherein extending the spring pack shifts the center shaft inwards; wherein inwards is toward the extension rod; wherein actuating the end cap assembly causes a high force; wherein the high force causes a rear face of the piston rod to press against the end cap assembly;
rotating the reciprocating pump such that the installed piston rod moves forward until the piston is engaged into a liner.

18. The method of claim 17, further comprising:
actuating the end cap assembly to relieve tension on the first cross-pin; wherein actuating the end cap assembly to relieve tension on the first cross-pin is moving the piston rod forward, into position;
rotating the reciprocating pump in an opposite direction, wherein rotating the reciprocating pump in the opposite direction as previously described creates a sufficient space for installing a subrod assembly;
installing the subrod assembly between the extension rod assembly and the piston rod; installing a front pin of the subrod assembly and a rear pin of the subrod assembly;
actuating the end cap assembly to release the spring compression; wherein actuating the end cap assembly to release the spring compression generates an axial force throughout the rod column, such that the axial force pulls all components tight against each other.

19. The method of claim 17, further comprising:
wherein the piston rod is a plunger assembly;
wherein the plunger assembly is pushed into a packing.

20. The method of claim 17, further comprising disassembling the rod column;

wherein disassembling the rod column comprises the following steps:

rotating the reciprocating pump such that the piston rod is nearer an end of a forward stroke;

actuating the end cap assembly to relieve the axial force clamping the rod column together;

removing the front pin of the subrod assembly and the second pin of the subrod assembly;

rotating the reciprocating pump such that the extension rod assembly moves away from the piston rod; wherein moving the extension rod assembly away from the piston rod provides space for removal of the subrod assembly;

removing the subrod assembly;

rotating the reciprocating pump such that the center shaft of the extension rod assembly engages the piston rod;

installing a cross-pin;

rotating the reciprocating pump such that the extension rod assembly moves away from a fluid end of the reciprocating pump;

removing the piston rod.

* * * * *